Dec. 22, 1964  O. H. INGBER  3,162,712
OPTICAL DEVICE FOR MEASURING THE WIDTH OR DIAMETER OF FIXED OR
MOVABLE TAPES, WIRES, TUBES, BARS AND THE LIKE
Filed May 31, 1960  21 Sheets-Sheet 1

Dec. 22, 1964           O. H. INGBER           3,162,712
OPTICAL DEVICE FOR MEASURING THE WIDTH OR DIAMETER OF FIXED OR
MOVABLE TAPES, WIRES, TUBES, BARS AND THE LIKE
Filed May 31, 1960           21 Sheets-Sheet 3
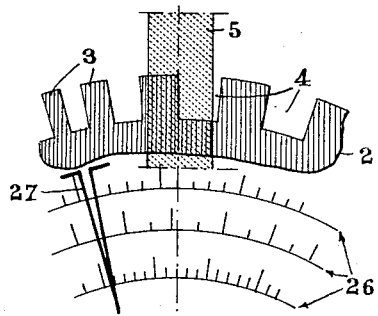
Fig. 7.
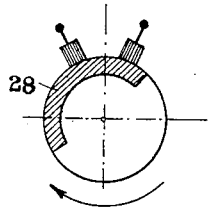
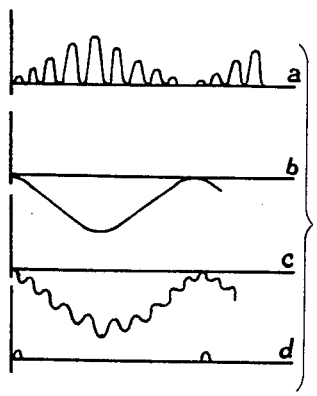
Fig. 8.
Fig. 9.
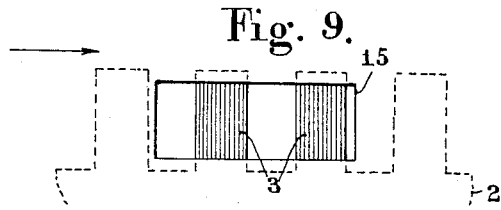

Fig. 10.
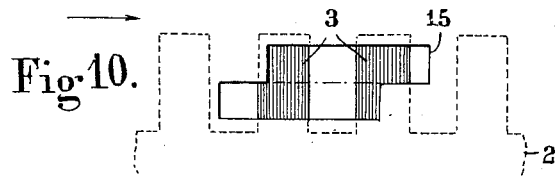
Fig. 11.
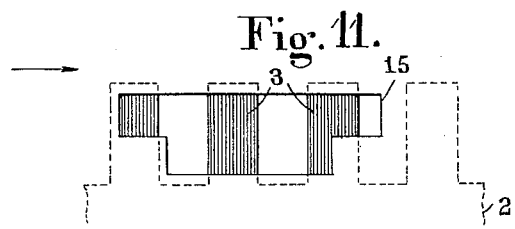
Fig. 12.  Fig. 13.
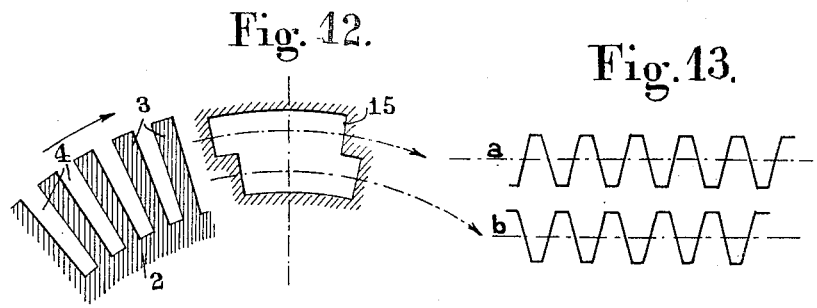
Fig. 14.
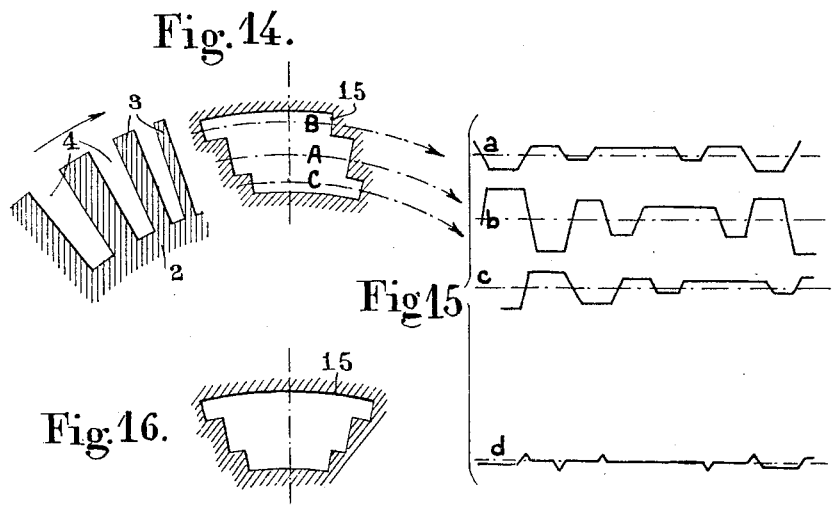
Fig. 15.
Fig. 16.
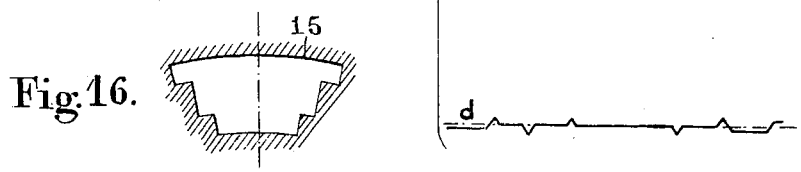

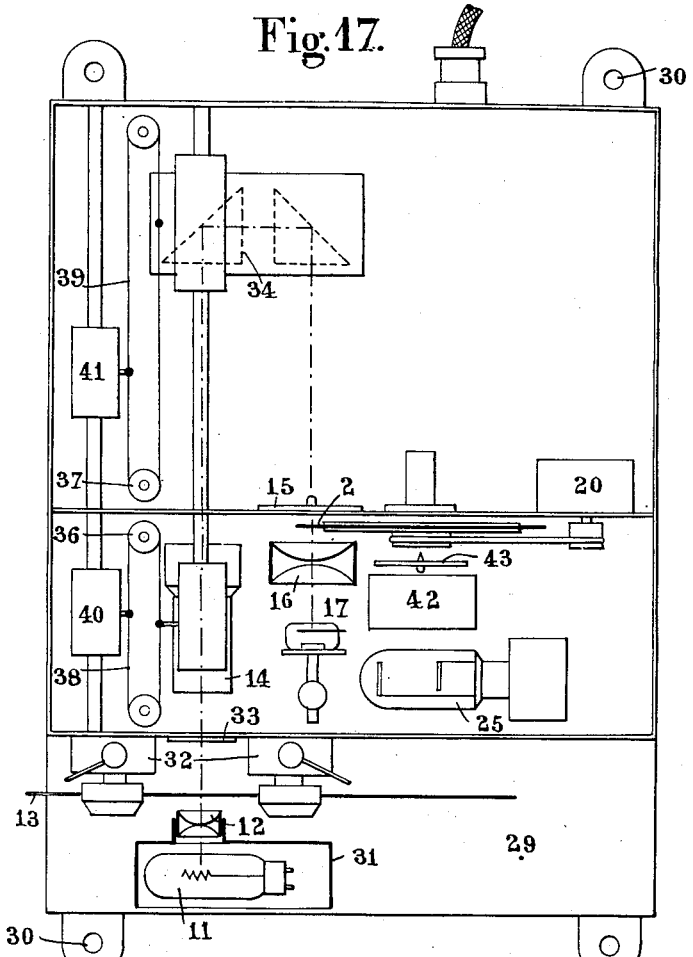
Fig. 17.
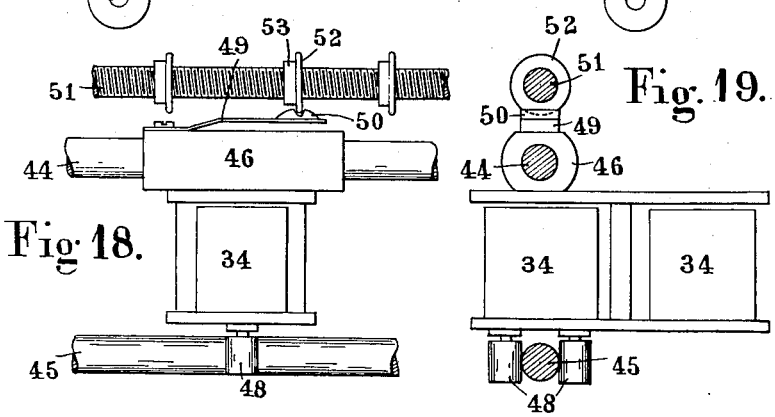
Fig. 18.
Fig. 19.

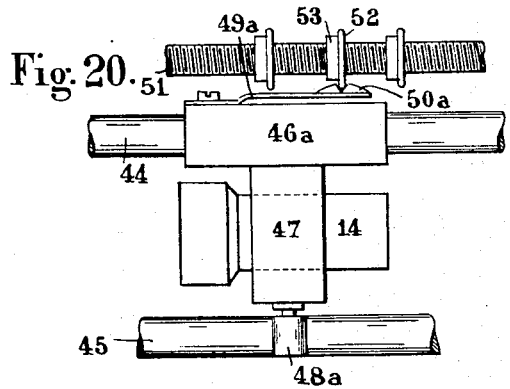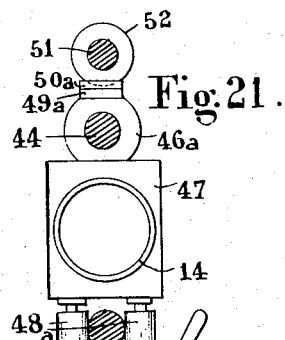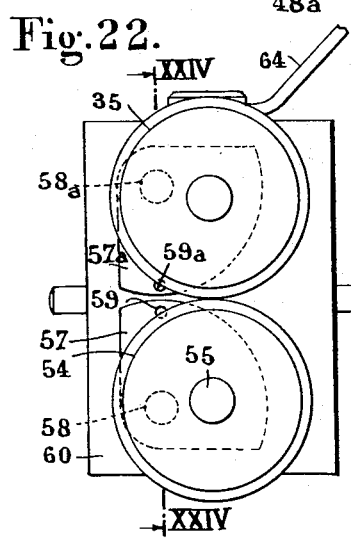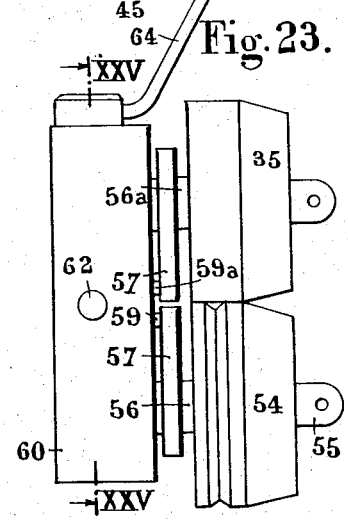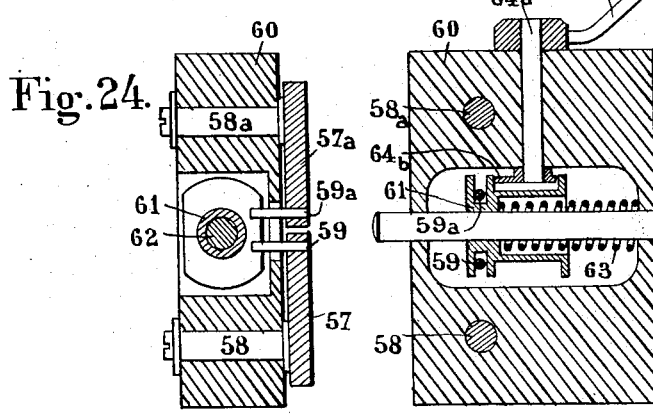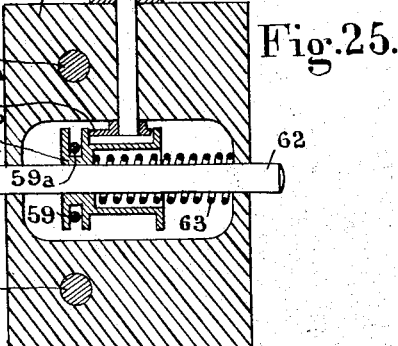

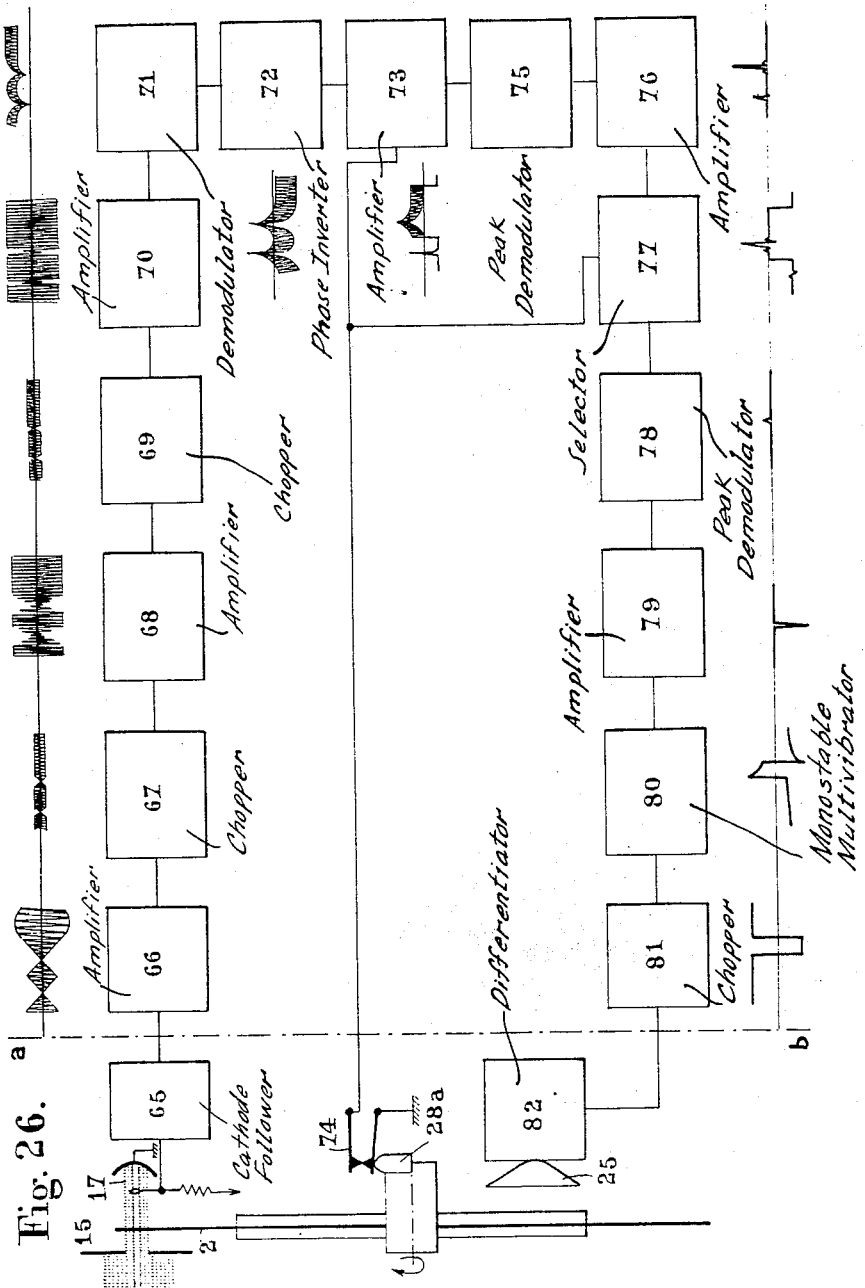

Dec. 22, 1964   O. H. INGBER   3,162,712
OPTICAL DEVICE FOR MEASURING THE WIDTH OR DIAMETER OF FIXED OR
MOVABLE TAPES, WIRES, TUBES, BARS AND THE LIKE
Filed May 31, 1960   21 Sheets-Sheet 9

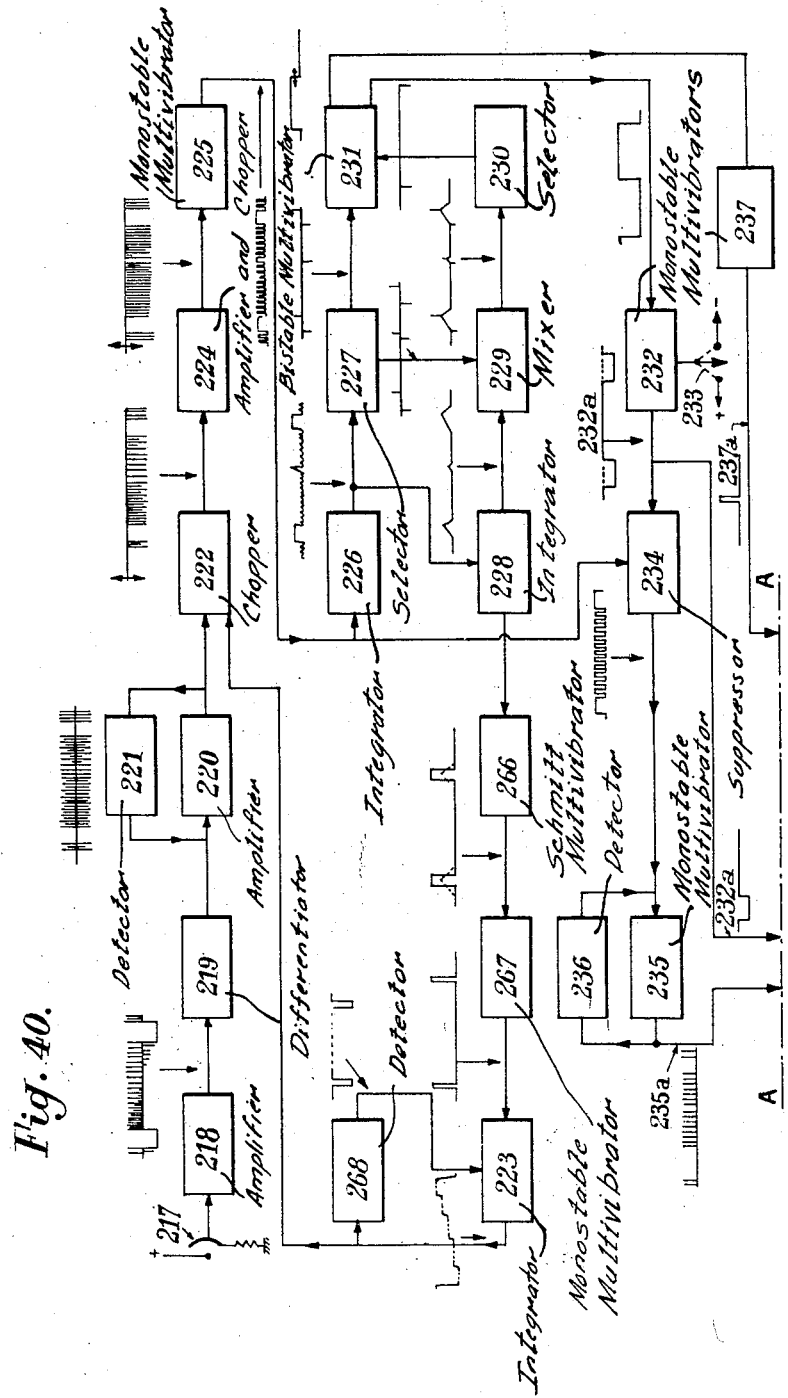

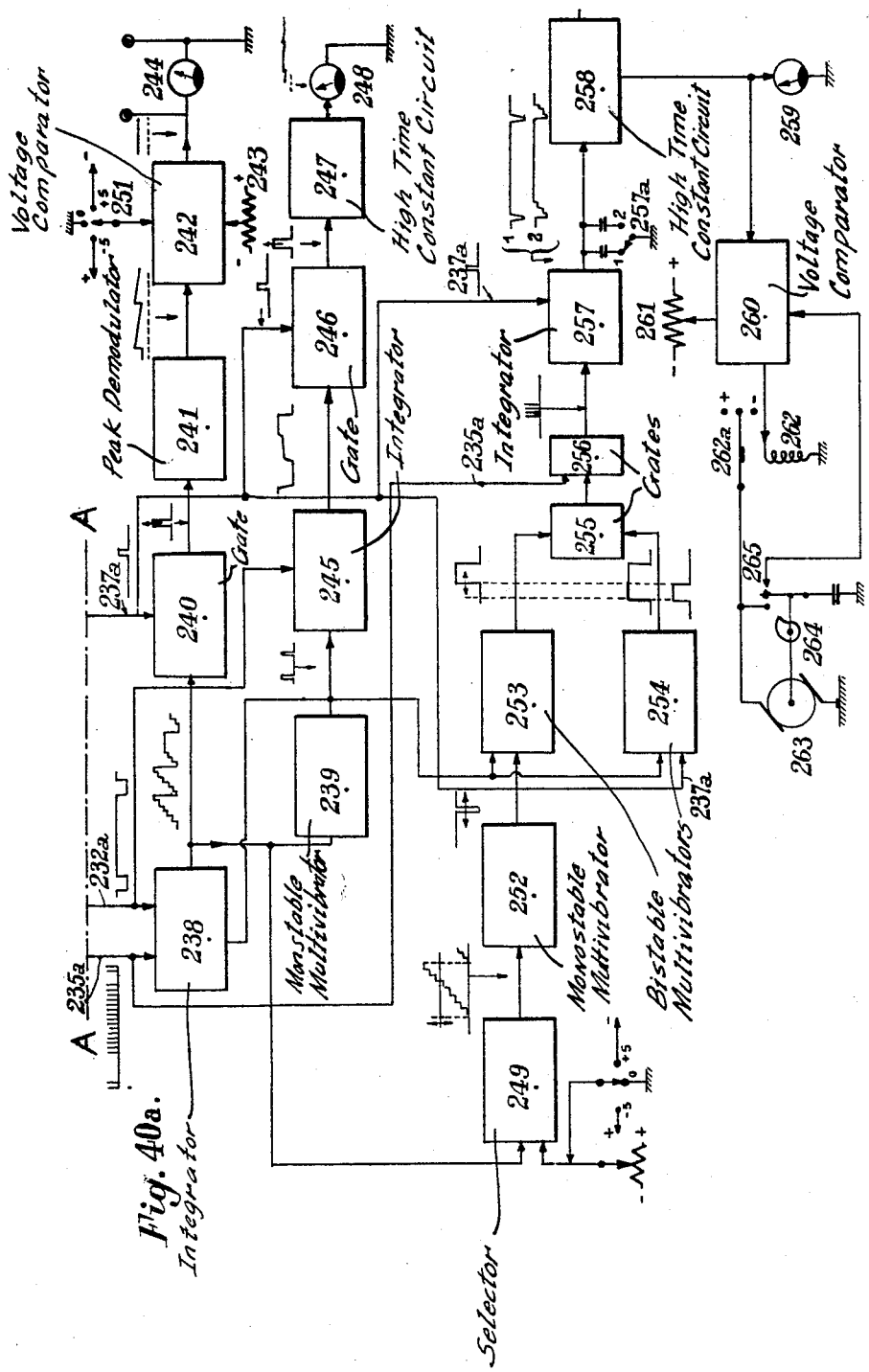

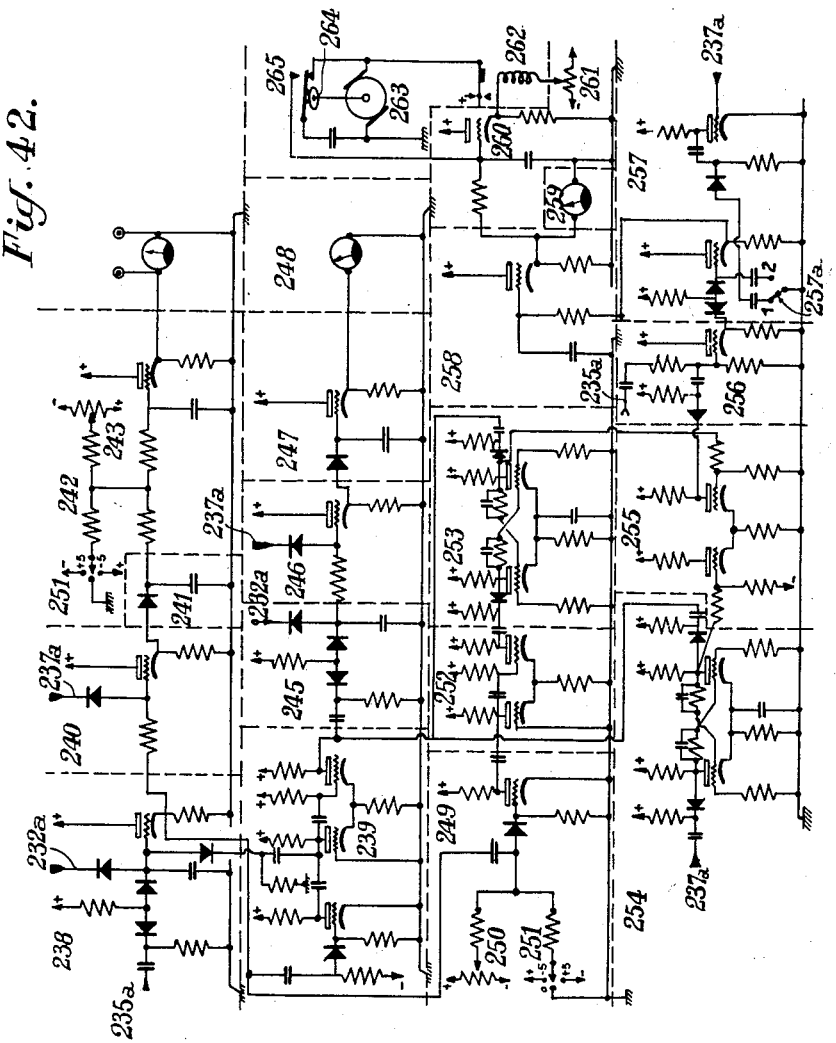

United States Patent Office 3,162,712
Patented Dec. 22, 1964

3,162,712
OPTICAL DEVICE FOR MEASURING THE WIDTH
OR DIAMETER OF FIXED OR MOVABLE TAPES,
WIRES, TUBES, BARS AND THE LIKE
Oscar Henri Ingber, 15 Boulevard du General Koenig,
Neuilly-sur-Seine, France
Filed May 31, 1960, Ser. No. 32,643
20 Claims. (Cl. 88—14)

This is a continuation-in-part of application Serial No. 776,307, filed November 25, 1958.

This invention relates in general to the measurement of the transverse dimension, i.e. the apparent width or diameter, of tapes, wires or cables, tubes, bars, etc. and has specific reference to an apparatus for effecting this measurement, for example on material either stationary or travelling continuously at a relatively high speed in the direction of its main longitudinal axis, even if the material undergoing the measurement is subjected to transverse vibration. More particularly, this device may be used for measuring the diameters of metal wires, tubes or cables during their manufacture, in order to maintain their transverse dimensions to a constant value through the medium of adequate control means actuated either by hand or automatically by the apparatus itself. The high velocity of travel of the objects thus measured (the following description referring only to wires or tapes taken by way of example of any other objects adapted to be measured by the device of this invention, in order to simplify the disclosure thereof) makes it obviously impossible to use the obsolete method of measuring their dimensions by means of so-called mechanical "feelers" controlling through mechanical, hydraulic or pneumatic transmission means a pointer or index, as the latter would be liable to hardly controllable rebound, not to mention the distortion likely to be caused by this feeler in the shape of the material to be measured, for example during the setting of the sheath of a cable.

One object of the invention is the provision of an apparatus for measuring the apparent transverse dimension of an object such as wire, cable, tube or tape driven for continuous longitudinal movement and likely to undergo transverse vibration during the measurement.

Another object of the invention is the provision of an apparatus for measuring the apparent transverse dimension of an object, this apparatus being adapted generally to permit the direct or indirect reading of the measured value without the assistance of any calibrating, gaging, or adjustment means and without any handling, in a manner completely independent of the general conditions of operation such as temperature, pressure, room illumination, mains voltage fed to the apparatus, wear of light sources and amplifying tubes, etc.

The manner in which the invention may be carried out under practical conditions will now be explained with reference to the attached drawings forming part of this specification and illustrating diagrammatically by way of example different forms of embodiment of the apparatus of this invention. In the drawings:

FIGURE 7 is a fragmentary diagrammatic view of a modified modulator disc.

FIGURE 8 is a diagram showing the signals likely to be obtained in this case.

FIGURE 9 illustrates one form of the diaphragm.

FIGURE 10 illustrates another form of diaphragm.

FIGURE 11 illustrates another form of diaphragm.

FIGURE 12 illustrates another form of diaphragm.

FIGURE 13 shows the signals corresponding to the diaphragm of FIG. 12.

FIGURE 14 illustrates a modified form of the disc and diaphragm.

FIGURE 15 illustrates the signals corresponding to the diaphragm of FIG. 14.

FIGURE 16 shows another modified diaphragm.

FIGURE 17 shows diagrammatically another apparatus.

FIGURE 18 is a plan view of a device permitting the sliding movement and the detent positioning of a system of prisms.

FIGURE 19 is a side view of said device.

FIGURE 20 is a plan view of a device permitting the sliding movement and the detent positioning of the lens system of the apparatus.

FIGURE 21 is a side view of said device.

FIGURE 22 is a front view of a wire-guiding device.

FIGURE 23 is a side view of said wire-guiding device.

FIGURE 24 is a section taken upon the line XXIV—XXIV of FIG. 22.

FIGURE 25 is a sectional view taken along the line XXV—XXV of FIG. 23.

FIGURE 26 is a block diagram illustrating the principle of the electronic operation and circuit of the apparatus of this invention, the resulting output signal being shown adjacent to each element.

FIGURES 40 and 40a, when assembled along the line A—A, constitute the block diagram illustrating the principle of operation and the chief components of the apparatus.

Figure 41:
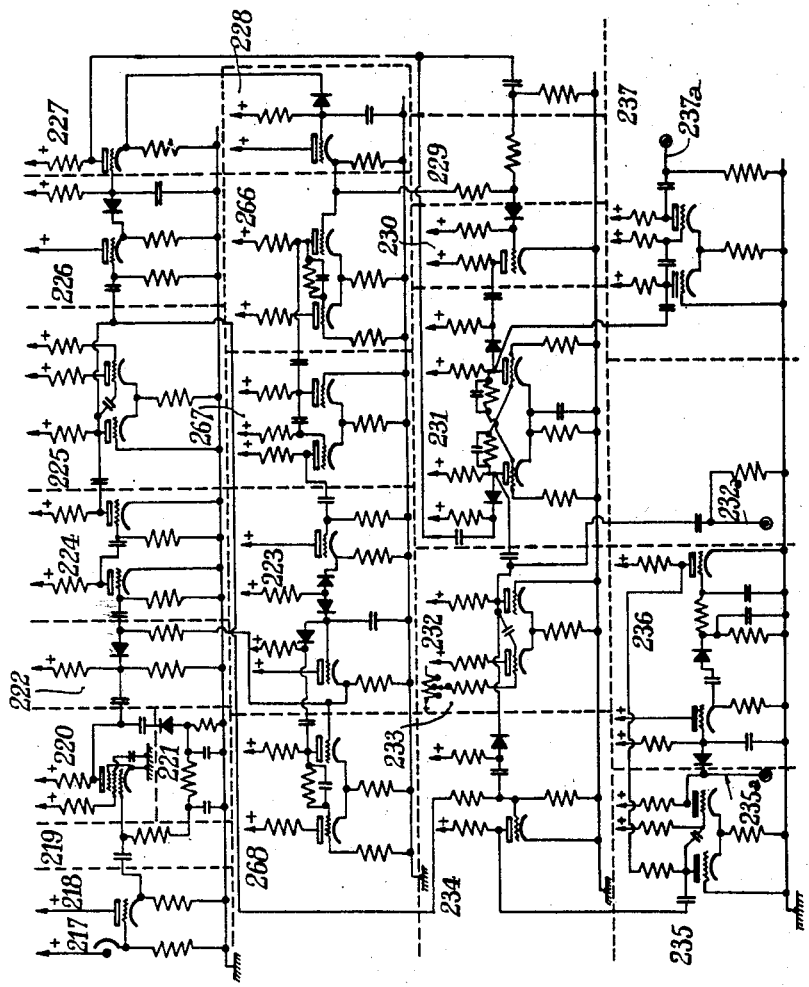

FIGURES 41 and 42 are wiring diagrams of the installation which show the principles of the apparatus.

Figure 1:
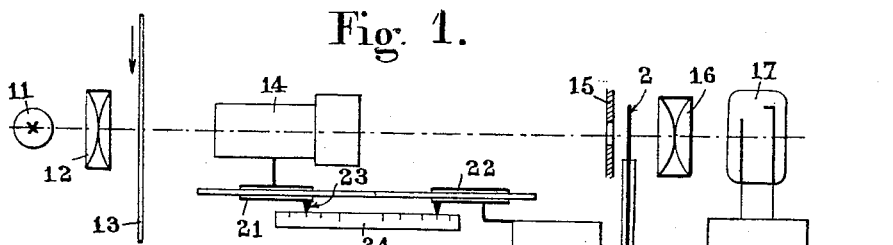
FIGURE 1 is a diagram illustrating a form of embodiment of the apparatus of this invention which comprises a modulating member.

The apparatus illustrated in FIG. 1 comprises a light source 11 illuminating through the medium of a condenser 12 a movable wire 13. The image 5 of the wire is formed by an optical system 14 on the surface of a modulator disc 2 driven from the motor 20 and formed with radial slots 4. According to a modified form of embodiment a cylinder formed through its peripheral wall with slots parallel to the generatrices may be substituted for the disc 2. The light flux having passed through the disc 2 and diaphragm 15 is subsequently collected by a condenser 16 on a photocell 17 followed by an alternating current amplifier 18 and a measuring instrument 19.

Figure 2:
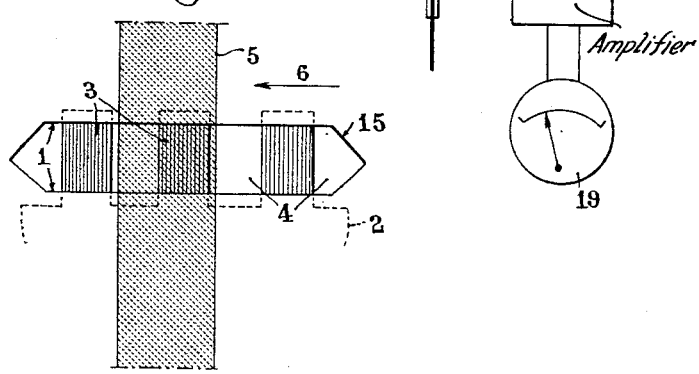
FIGURES 2 and 3 illustrate diagrammatically the superposition of a modulator disc, a diaphragm and the image of the object to be measured in two different cases.

In FIG. 2 the disc 2 is formed with peripheral teeth 3 of same width as the slots 4 with which they alternate, these teeth moving past and behind the diaphragm 15 limited in the radial direction by the lines 1 and the image 5 of the object to be measured. If the pitch (i.e. the width of one tooth plus that of one slot assumed to be of same width) of the modulator disc is equal to the width of the object image the edges of which are parallel to those of the slots as shown in FIG. 2, the variations in the flux portions transmitted by one fraction of the modulator disc in the vicinity of the two edges of the image are equal and opposite, and therefore the aggregate flux is blocked by the assembly consisting of the modulator disc and the wire image remains constant in spite of the disc movement, for example in the direction of the arrow 6.

Figure 3:
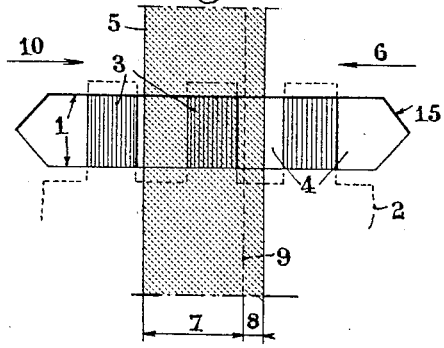
Figure 4:
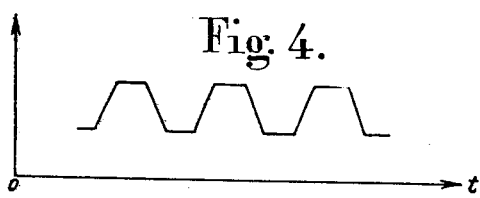
FIGURE 4 illustrates the shape of the signal picked up in the case shown in FIG. 3.

In the case illustrated in FIG. 3, it is assumed on the contrary that the image 5 of the object to be measured is wider than the pitch of the modulator disc. This image may be considered as consisting of a partial image having the width of the pitch 7 plus a complementary image 8, these images being separated by a line 9. The first partial image similar to that of FIG. 2 does not give any resultant signal. The complementary image produces a signal proportional to the flux variation quantity which would be blocked by the portion 8 alone due to its movement in the direction of the arrow 10 which is opposite to the direction of travel 6 of the modulator disc. This signal shown in FIG. 4 consists of a series of trapezoidal pulses the duration and amplitude of which are proportional to the width of the partial image 8.

The simultaneous displacement of the disc 2 and lens 14 along the optical axis of the system is adapted to cause the magnification of the apparatus to vary until the width of the wire image 5 becoming equal to that of the pitch of the modulator disc the alternating photoelectric current is zero, as already explained. From the displacement of the members for positioning the lens system 14 and disc 2 which is necessary for obtaining this specific magnification of the wire image, it is possible to determine the wire diameter which may be indicated for example by the pointer 23 of the slider 21 solid with the lens system and by the pointer carried by the other slider 22 of the motor 20 and disc 2, these pointers travelling past the scale 24.

Figure 5:
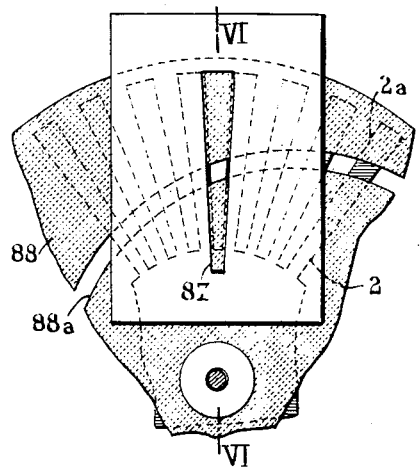
FIGURE 5 is an elevational view of a modulator disc.
Figure 6:
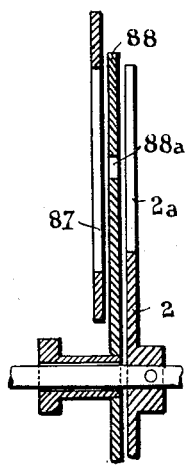
FIGURE 6 is a longitudinal section taken upon the line VI—VI of FIG. 5.
Figure 27:
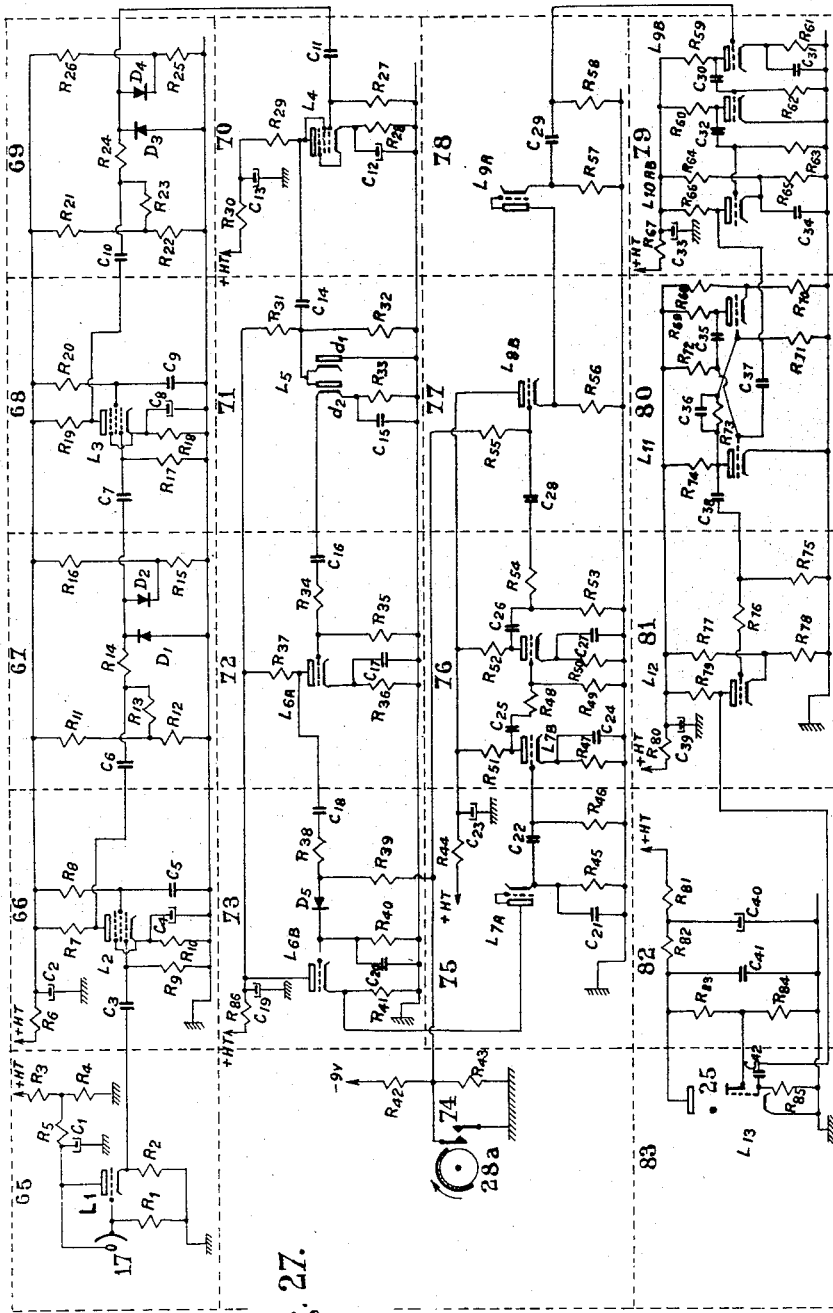
FIGURE 27 shows the details of the different component elements of this circuit.

According to a modified form of embodiment of the device the effect of reducing the current to zero may be obtained by modifying the width of the slots and teeth of the modulator disc (or of the useful portion of these slots). This current reduction may be obtained by utilizing a modulator disc 2 formed with relatively long radial slots 2a (see FIGS. 5 and 6) in combination with an auxiliary but stationary disc 88 superposed on and coaxial to the disc 2. The angular position of the auxiliary disc 88 may be adjusted manually, if desired. The disc 88 is formed with a relatively narrow transparent spiral aperture 88a separating, in front of a stationary radial gate 87 (having the shape of a narrow circular sector) substantially parallel to the edges of the image of the wire to be measured, one portion of the modulator disc 2 which is more or less close to its center and wherein the slots and teeth have therefore different widths.

According to another modification illustrated in FIG. 7 the modulator disc 2 may comprise a plurality of slots 4 and teeth 3 of unequal widths, notably of a regularly increasing width along an arc covering one portion or the whole of the circumference of the modulator disc or cylinder. The photoelectric signals become null or assume a minimum value when said disc is in a certain angular position wherein the width of the above-defined pitch becomes close to that of the image of the object to be measured, and it is possible to mark this width by means of a stroboscopic lamp or a time-check lamp illuminated under the influence of the photoelectric signal when the latter attains its minimum value, this last-mentioned value being determined by means of an adequate electrical circuit or circuit of which a typical form will be described presently. The rotary disc may comprise one or more scales 26 moving past a stationary pointer 27 indicating the wire diameter due to the stroboscopic effect when the width of the wire image becomes substantially equal to the pitch value of the modulator disc. Thus, a discontinuous indication of the values to be measured, which are definitely independent of the conditions of operation, for example the luminous intensity of the light source, the normal wear of the amplifying tubes, etc. is obtained.

When the above-described apparatus is utilized for measuring an object the dimension of which varies at a fast rate, the different figures appear under the pointer during a relatively short time period and therefore cannot be easily read. Under these conditions, other specific means for indicating the desired variation values must be used for measuring fast-varying magnitudes, according to the methods set forth hereinabove.

When the measured magnitude is subjected to rapid variations it is well on the one hand to permit a more frequent reading of the value indicated by the apparatus by replacing the successive appearances of the different figures in front of a fixed reference mark with the displacement of a movable mark along a stationary scale carrying figures readable even if the mark undergoes frequent and sudden changes in its position for the successive positioning of these different figures in front of a stationary pointer or reference mark. On the other hand, when the rapidity of the variations of the measured magnitude is such that a sufficiently rapid reading of the measured value becomes impossible even in the last-mentioned instance, it is well to replace the direct values of this measured magnitude as they would be indicated by the apparatus as a function of time, with an adequate function of these values the variation of which is slower, such as the maximum and minimum values of the magnitude measured during a relatively long time period, or the average value of the measured values, or the average value of the difference between the measured magnitude and a certain pre-adjusted value.

In order to obtain these effects the time check lamp incorporated in the device, or a plurality of similar lamps, are used for illuminating a mark rotating bodily with the measuring disc past a stationary scale so that it becomes possible on the one hand to read more easily data subject to fast variations, and on the other hand to read the maximum and minimum values of the same data, notably through the medium of movable indices in the form of points sliding along a small rule, which may be set manually on the extreme indications of the apparatus. This type of indication is also advantageous for appreciating, by the frequency and intensity of the indications, the intermediate values of the average values of the magnitude measured by the apparatus.

The mark utilized to this end may consist of a black line on a clear background (of diffusing or transparent characteristic) or a clear line on a dark or opaque background of the measuring disc, or of a disc or drum driven in synchronism therewith. It may also consist of a line separating the two zones of the disc or drum, one zone being transparent (or diffusing) and the other opaque (or black).

The form of this mark may be that of a radial line on the revolving disc or a line inclined relative to the radius of this disc, or a curve, notably an arithmetic spiral. The form of the scale registering with this rotating mark may also vary. Preferably, it will be circular in the case of the radial form, inclined relative to the disc radius, or curved, for example spiral-shaped notably if the mark itself is spiral-shaped (in order to increase the length of this scale).

The same disc may carry a plurality of these marks, notably a plurality of spirals or curved lines having variable inclinations and thus produce, in addition to the approximate indication of the dimension of the object on one of the extended measurement scales, "geared down" and more precise indications on other scales. These scales may also be interchangeable by hand or by means of mechanical or electrical control means for adapting them to different ranges of measurements between the different dimensional limits of the measured object.

The locating or reference mark may also consist of the rotary flashing lamp itself or of a mirror or other bright object, for example a polished metal cylinder or sphere illuminated by a fixed lamp. In all the cases contemplated the illumination may be effected by means of one or more flashing lamps.

The apparatus described hereinabove with reference to FIGS. 1–7 of the drawings may be characterized by the following features:

Mounted on the shaft of the modulator disc 2 is a commutator 28 (see FIG. 7) adapted to open or short-circuit (as will be described hereafter) the output circuit of the electrical circuit during those time periods in which the disc cannot be used, notably when on the outer periphery of this disc the widest slot is constantly caused to be followed by the narrowest slot. It is also possible to use discs formed with slots providing an even number, for example two, of similar consecutive variations in their width, one variation increasing gradually and the other decreasing also gradually. In this case at least two different and opposite scales will be used, but the commutator device becomes useless. The latter may however be used for periodically recharging a capacitor the discharge of which is adapted, under the influence of the single minimum amplitude signal per revolution of the modulator, to light up the flashing lamp.

The modulator cylinder or disc may be traced graphically and subsequently reproduced by photographic means, and in this case it will consist of a support of transparent material on which a photo-sensitive layer is applied, whereby the shape of the disc slots as well as other details, such as the scales for reading the measured values, may be reproduced.

The electrical circuit of the device described hereinabove by way of example may comprise, after an amplifier for the photoelectric current issuing from a cell of an electron multiplier, a circuit consisting of a monostable multivibrator responsive to the signal pulses and the cycle of which is slightly greater than that existing between any two consecutive photoelectric signals. This monostable multivibrator produces a voltage acting as a polarizer in the flashing lamp control circuit to prevent its discharge. Under these conditions it is only when the width of the wire image becomes substantially equal to that of the disc pitch as defined hereinabove and when the photoelectric pulse corresponding to this disc position is absent that the flashing lamp may become illuminated to provide the desired stroboscopic effect.

The adjustment of the threshold of sensitivity of this apparatus may be rendered automatic and obtained through the medium of a polarisation caused by a voltage resulting from the demodulation of the flashing lamp discharge circuit, whereby, for a given and adequate initial adjustment, this threshold will be maintained automatically to such a level that in the average only one discharge takes place during one period of the variation of the slot widths, for example during one period of the revolution of the modulator disc, irrespective of the strength of the photoelectric current.

Another modified form of embodiment of an electrical arrangement that can be used in the above-described device comprises means for detecting the average voltage of the signal. The average value of the thus detected voltage is of the slow-varying type. This voltage is superposed on the alternating voltage of the non-demodulated signal, the direction of this superposition being such that the lowest or weakest alternating signals are caused to appear in the form of a maximum (the slow-varying voltage having a suitable polarity and being notably more intense than the alternating pulses of the signal). In FIG. 8 of the drawings the reference letter $a$ is the photoelectric signal, $b$ is the demodulated average voltage and $c$ is the sum of these two signals showing an absolute maximum when the alternating photoelectric signals attain their minimum values. This circuit is followed by a "maximum selector" adapted, by means of one or more choppers the automatic bias of which is controlled by the demodulated signal, to isolate as shown at $d$ a single pulse (or at the most two pulses) of maximum value per cycle of the modulator disc pitch variation.

In the above-described device the edges of the diaphragm (like the edges of the object to be measured) are crossed by the edges of the slots in the modulator disc. This produces a disturbing signal similar to the useful signal resulting from the crossing of the edges of the image by those of the slots, the disturbing signal being superposed on the useful signal. The disturbing signal may be reduced in the case of a disc having slots of fixed width by providing a diaphragm width which is a whole multiple of one pitch of this disc (see FIG. 9). For reasons similar to those already set forth in conjunction with FIG. 2 the optical signal obtained from this diaphragm is null.

The same effect may also be obtained by using a diaphragm of any desired width but consisting of two similar portions (having the shape of fragments of circular annuli separated or not in the case of a modulator disc) superposed along the radius of this modulator disc or along the edges of its slots but with one portion shifted relative to the other (see FIG. 10), or of greater width than the other (see FIG. 11), by the value of an odd number of slot width (or a tooth width assumed to be of same width) of the diaphragm. In this case the disturbing signals caused by each diaphragm portion are opposed to each other so as to cancel each other, as shown in FIG. 13 corresponding more specifically to the disc and diaphragm assembly of FIG. 12.

In FIG. 13 the curve $a$ designates the signals generated by the upper half portion of diaphragm 15, and curve $b$ the signals generated by the lower half. Under these conditions, as the signals $a$ and $b$ are shifted relative to each other they cancel each other.

If a disc formed with slots of variable width is used, none of the two means set forth hereinabove will provide a sufficient reduction of the disturbing signal for all the slots of this disc at a time. In this case one may use a diaphragm consisting of three portions superposed as hereinabove and formed with edges still parallel to the slot edges but shifted in relation to one another (see FIG. 14) or having different widths (see FIG. 16). Thus, the main portion A of the diaphragm (for example its central portion) the dimension of which, as measured along the radius of the modulator disc, is twice that of each one of the other two B and C, being determined, the edges of the other diaphragm portions are shifted or displaced relative to those of the main portion by a width equal to an odd multiple of the mean width of the slots, but these shifts or variations in the width difference are of opposite directions as far as these other or secondary diaphragm portions are concerned. As a result, two residual signals corresponding to each auxiliary portion of the diaphragm are obtained, one signal leading and the other lagging in phase in relation to the disturbing signal caused by the main portion. Thus, the sum of these two signals is reduced considerably as clearly apparent from FIG. 15 showing the different partial signals resulting from the passage of the disc slots across these various portions of the diaphragm (at *a*, *b* and *c*), the lowermost graph *d* showing the shape of the sum of the resulting signals. It is evident that this sum is strongly reduced in the case of the last two diaphragms proposed in FIGS. 14 and 16.

An effect complementary to the reduction of the disturbing signals may be obtained by giving to the diaphragm edges and notably to the edges of the diaphragms set forth hereinabove not a sudden but a gradual variation in the transparency by thinning out or inclining them relative to the edges of the modulator disc slots; moreover, the electrical circuits may comprise tuned filters or circuits adapted to eliminate the low frequencies caused by the passage of the slots of the modulator disc on the edges of these diaphragms and to pass the higher frequencies corresponding to the sudden signal produced by the passage of the slot edges on the image of the parallel edges of the object to be measured.

If the entire modulator disc assembly receives through it the luminous flux from the source which is collected by the photocell, no disturbing signal will appear. With this means the use of the above-defined methods may be dispensed with.

The residual stray photoelectric signal likely to subsist as a consequence of an insufficient compensation of the optical signal caused by the diaphragm edges may be compensated by superposing thereto a proportional electrical or optical signal varying in the opposite direction which may be read and recorded from the disturbing photoelectric signal on a magnetic track carried by the rotating disc or on a photographic track similar to that formed on talking films, this last-mentioned track being adapted for example to be positioned along the peripheral edge of the rotating disc and to either produce an illumination modulated on the cell or assume the length or transparency of the slots formed in this disc.

The same effect may also be obtained by printing on the modulator disc, adjacent to the main slot annulus, another, auxiliary annulus negative relative to the former and associated with a diaphragm similar to that of the main device but slightly shifted angularly relative thereto to prevent the image of the object to be measured from passing therethrough, whereby an additional beam responsive to variations in the illumination which are exactly complementary to the stray variations resulting from the diaphragm of the first annular set of solts is transmitted towards the cell.

The tape or wire to be measured may be guided or maintained fore and aft of the optical measurement field by a pair of devices consisting for example of rollers urged by spring means against each other but interconnected through jointed coupling of the gear, cam or link type of which a typical example will be described presently; the function of these couplings is to allow only a simultaneous symmetrical movement of these rollers away from each other when necessary. One or both rollers may comprise a groove for properly centering the guided tape or wire as it travels past the measuring instrument.

The wire or tape vibration will not interfere appreciably with the precision of the measurement. However, this vibration may be reduced by using presser pads or rollers lined preferably with a suitable flexible material disposed on either side of the above-mentioned guide rollers and adapted to prevent the formation of sustained oscillation and "loops" on the wire portion travelling between the two pairs of guide rollers.

A similar device may be used for measuring objects having very different dimensions by simply changing the optical magnification and simultaneously modifying the reading scale. This change, effected in a discontinuous manner, may be obtained by means of a hand-controlled so-called "detent positioning" mechanical device adapted to displace simultaneously, for example through the intermediary of suitably shaped cams, on the one hand the lens system and on the other hand an "optical vehicle" for modifying by its position the length of the optical path either between the lens system and the wire or between the lens system and the modulator disc. This control device may be used for displacing at the same time a "reading gate" movable in front of a plurality of scales in order to cause the latter to correspond to the range of measurements to be effected.

In an arrangement of this character an estimate of the percentage (%) of relative variation in width or diameter may be made on a specific scale in relation either to a reference object or wire or to a pre-adjusted arbitrary value, or to the initial value of the measured object of which a preliminary calibration was effected. To this end, a scale driven bodily with the modulator disc comprises several reference marks of which some are designated at spaced intervals by the digit "zero" ("0") and others by numbers designating percentage values increasing on the one side and decreasing on the other side (positive relative variation and negative relative variation). An adjustable pointer is set in front of a "zero" appearing behind the reading gate for the desired or preset dimension of the object to be measured. When this dimension varies, this pointer becomes coincident with other marks on the scale, thus indicating the percentage of relative variation of the dimension in the negative or positive direction.

Apertures or transparent windows in the modulator disc on the one hand and in a stationary opaque screen superposed thereto, on the other hand, which are formed with edges either of a gradually varying transparency or so inclined that the width of these apertures or windows change continuously, may cause an auxiliary light flux of variable intensity to be transmitted from a flashing lamp to auxiliary cells when the measured dimension undergoes a variation exceeding a certain adjustable limit, plus or minus. The currents from these cells may be used for either releasing an automatic reaction in proportion to the dimensional discrepancy occurring in the object to be measured, for actuating for example an alarm device, or causing a displacement of adjustment members adapted to reset to "zero" the indication of the device; in this last case this displacement may show directly the result of the measurement; alternately the same currents may be used for modifying one of the parameters to which the dimension of the object is responsive durnig its manufacture for example the linear speed of a wire conditioning the thickness of a cable sheath, etc.

The accuracy of the apparatus may be further increased due to the possibility of measuring intermediate values between those which, in a discontinuous manner, are shown by the stroboscopic device. To this end, a relatively low alternating voltage or the background noise voltage alone may be superposed to the photoelectric current (this low alternating voltage being asynchronous relative to that of the photoelectric signal), the superposed voltage having an amplitude value close to the difference between those of the two consecutive photoelectric signals. This additional voltage causes an alternate emergence of the two signals close to the minimum and the successive appearance of the scale figures corresponding to the values close to the dimension to be measured when this value is situated between those corresponding to these two indications. Under these conditions and due to the stroboscopic effect two consecutive figures are observed simultaneously in front of the pointer, one figure being an even number and the other an odd number, for example. If these numbers are so traced that their images do not superpose each other, for example by placing one number to the left and the other number to the right, or one above and the other beneath the scale reference mark, the fact that these two numbers can be read simultaneously will prove that the dimension of the object to be measured lies between the two values thus appearing simultaneously.

If the modulator disc comprises a plurality of zones in which the slot "pitch" varies gradually, these slots may differ along these zones for example in that the pitches of one zone have a value intermediate to those of the other zone. Under these conditions two corresponding numbers of the scales corresponding to these different zones appear simultaneously due to the stroboscopic effect. This makes it also possible to establish those cases wherein the dimension of the measured object lies between the discontinuous values of the successive pitches of the slots in the modulator disc.

During the manufacture of the objects to be measured, for example cables, these are frequently caused to travel through water-filled vats and this may cause droplets to adhere on the surface of the object and thus interfere with the precision of the measurement. The following means may be used to avoid this inconvenience.

The wire, tape or cable to be measured may be passed between adequate pads, or subjected to a cold or warm air stream, or pulled through a heated drying room, or the measurement itself may be effected within the liquid medium proper, for example in the water-filled vat utilized for cooling the cable during its manufacture. The same effect may be obtained by using a "peak demodulator" for automatically blocking the electrical circuit at the very moment when the photoelectric signal becomes the seat of a pronounced alteration as a consequence of the passage of a droplet past the measuring device.

If the object to the measured (for example a tape) is not circular-sectioned its maximum transverse dimension or apparent width according to different directions may be determined by causing the tape or the like to travel past a plurality of similar apparatus. The data supplied by these apparatus may then be combined or composed automatically or not to provide a resultant, for example the minimum or maximum apparent width or their difference and ratio. A same and single apparatus may be used for measuring a plurality of apparent widths, for example according to two directions at right angles to each other by periodically changing the direction of or rotating either the object to be measured or one portion of the measuring apparatus which may comprise for example two light sources or two sets of prisms reflecting towards the lens by means of a mechanical switching device the light fluxes directed across the measured object in directions perpendicular to each other.

Two or more similar apparatus may be used for measuring the apparent width of an object having a non-circular cross-section, for example a tape, in different directions. A same device may indicate by turn two or more of such measurements if the direction of the light beam illuminating the object to be measured is altered mechanically and in a cyclical, for example continuous or discontinuous manner. The same effect may be obtained by providing two or more light sources or projectors adapted to illuminate the measured object at the same or at different locations but from different directions. If a shutter is provided, only one of these projectors can be used momentarily at a time. This device may be for example of the type comprising a set of rotating or oscillating mirrors or blades, or adapted cyclically to extinguish the projector lamps, or consist of a polarizer rotating in front of two beams issuing from the projectors the fluxes of which are directed against a common lens system (for example by using a semi-transparent mirror) and polarized along two planes at right angles to each other. The different luminous fluxes from these projectors may be supplied from a single source and be only reflected and/or deflected by fixed or movable mirrors or prisms in different directions.

A detailed description of a device utilizing the different component elements broadly set forth hereinabove, is given hereafter with reference to FIGS. 17 to 27 of the drawings.

The complete apparatus comprises two portions interconnected by a cable. The first portion comprises the optical and mechanical elements as well as the reading device and is positioned on the path of the movable object to be measured. The other portion containing the electrical circuitry may be remote from the former.

The first portion is shown in FIGS. 17 to 25 inclusive. It is supported by a rigid base 29 adapted to be secured by lugs 30, for example, across the path followed by a tape, wire or cable during its manufacture. The light source is enclosed in the casing 31 and consists of a bulb 11 and a condenser 12. This source illuminates uniformly the tape, wire or cable 13 to be measured, which is held in position by a pair of transverse guide devices 32 to be described presently. The light flux penetrates into the apparatus through a glass window 33. A lens system 14 and a set of two total-reflection prisms acting as an "optical vehicle" 34 are adapted to form the image of the object to be measured, for example a wire, on the rotating modulator disc 2 formed with slots and teeth of gradually varying width and disposed behind the diaphragm 15 of the type described hereinabove and consisting of three portions having their edges shifted angularly by one-half of the average pitch of the disc (see FIG. 14). The modulator disc is rotatably driven from a motor 20.

Different magnifications corresponding to different ranges of measurement may be obtained by controlling by means of knobs 36 and 37 respectively the displacement on the one hand of the lens system and on the other hand of the set of prisms, both mounted for sliding movement on guide rails parallel to the light beam axis. The mechanical connection between the control knobs 32 and the member to be controlled is effected through the medium of cables 38, 39 tensioned by adequate springs (not shown). The apparatus may be used in any position, notably in the vertical position, due to the provision of counterweights 40, 41 secured on the slack side of these cables. An adjustable detent positioning device for example of the type described hereinabove is provided for somewhat locking the movable members in predetermined positions corresponding to the different ranges of measurement.

The light flux having passed through the modulator disc is collected by the photocell 17, a suitable condenser 16 being interposed to this end. The measurement scales carried by the modulator disc are illuminated by the flashing lamp 25 through a prism 42 adapted partially to reflect the beam. The reading is effected on the graduated scales of the disc illuminated stroboscopically by this lamp through the prism 42 and in front of an adjustable reference mark 43 formed on the surface of a "reading gate" (not shown) of the front face of the casing containing this portion of the apparatus.

The two similar devices for guiding and detent-positioning the lens and prism systems respectively are illustrated in FIGS. 18 to 21 of the drawings.

Rail-forming cylindrical rods 44 and 45 are provided for supporting and guiding the set of prisms 34 and the the lens system 14. Slidably mounted on the rail 44 is a block 46 solid with the prism-containing case 34, on the one hand, and a similar block 46a solid with the support 47 carrying the lens system 14. These blocks 46, 46a carry each in turn a pair of rollers 48, 48a engaging diametrally opposite generatrices of the rail 45.

The sliding blocks 46, 46a carry spring blades 49, 49a respectively each provided on its free end with a shoe 50, 50a having a V-shaped notch formed therein, as shown. The screw shaft 51 parallel to the rails carries discs 52 adapted to be locked in suitable positions on this shaft after corresponding nuts 53 associated with these discs have been adjusted and locked.

During the displacement of the optical elements along the rails the discs 52 engage the notches of shoes 50, 50a in order to effect the detent positioning of the prisms 34 and lens 14 in predetermined positions corresponding to the different magnifications and measurement scales.

FIGURES 22 to 25 inclusive of the drawings illustrate the device for guiding the wire, tape or cable to be measured in the apparatus. Two identical devices are disposed on either side of the light beam issuing from the condenser 12.

Each device comprises a plain roller 35 and a grooved roller 54, both mounted on ball bearings (not shown). The grooved roller may be changed for example to suit different wire gages, by loosening the screw 55. The two shafts 56, 56a carrying the rollers 54 and 35 respectively are solid with segments 57, 57a having substantially the shape shown in FIG. 23; these segments are pivoted in turn on pins 58, 58a. Each segment 57, 57a carries a pin 59, 59a extending into the block 60 supporting the guiding device.

Slidably mounted in a recess formed within this block 60 is a member 61 carried by a rod 62. This member 61 is formed with a groove engaged by the inner ends of pins 59, 59a. A compression spring 63 mounted on the rod 62 constantly urges the member 61 in a direction tending to move the guide rollers 35, 54 towards each other while maintaining these rollers in symmetrical positions relative to the axis of the wire, cable or tape; under these conditions, the latter is constantly centered in the device.

To move the rollers 35, 54 away from each other, for example when it is desired to insert or remove a wire, the operator rotates a hand lever 64 solid with a rod 64a and a cam 64b (see FIG. 25); thus, the member 61 may be displaced on its rod 62 against the resistance of the spring 63. After the wire or like object to be measured has been properly inserted between the guide rollers 35, 54 the control lever 64 of each device is restored to its initial position.

The second portion of the apparatus comprises the electronic circuit and its energizing means. In the block diagram of FIG. 26 illustrating the principle of this mounting the chain-dotted line a–b designates the separation between the optical and mechanical portion of the apparatus and the electrical and electronic circuit.

The luminous beam modulated by the rotating disc 2 formed in this example with "teeth" and slots of a width varying gradually according to two progressions, one increasing and the other decreasing, is received by the photocell 17. The resulting photoelectric signal is fed to a follower cathode 65 connected by a cable to an amplifier 66. The output of this amplifier is fed to a symmetrical chopper 67 reducing the pulses of all the elementary photoelectric signals to a very low amplitude close to that of the signals corresponding to the position of the modulator disc for which the width of the wire to be measured is approximately equal to one pitch of said disc. The output current from this chopper is amplified in another amplifier 68 and then chopped in another symmetrical chopper 69 completing the effect set forth hereinabove. The signal is again amplified at 70 and fed to a demodulator 71. The latter produces a demodulated and filtered component the variation of which corresponds to that of the average amplitude of the alternating signals. However, it does not cause a complete suppression of the alternating portion of the signal (at the frequency of the photoelectric signals) which remains superposed to the demodulated voltage. As a consequence, the (negative) maxima of the absolute value of the output signal of this circuit are caused to appear when this alternating portion of the signal is minimum (in absolute value). A phase inverter 72 and another amplifier 73 will then cause the signal to be subjected to a complementary "pre-selection" operation. The latter is necessary because the modulator disc comprises "teeth" and slots of a width varying gradually according to two progressions, one in the increasing direction and the other in the decreasing direction. Only one of these progressions is utilized, that is, the one covering the major portion of the disc circumference, and the effect caused by the other disc portion when it moves in front of the diaphragm must be suppressed. To this end, a cam 28a driven by the shaft of disc 2 and constituting the equivalent of the commutator 28 of FIG. 7 is adapted to close a contact 74 during the corresponding portion of the period of revolution of the disc, and applies a blocking voltage to the pre-selector device. Thus, the signals are partially "heightened." A peak demodulator 75 may thus be used for selecting the signal corresponding to the sole useful portion of the modulator disc. The demodulated signal is amplified at 76 and again fed to a selector 77 similar to the preceding one and adapted to eliminate any residue of the signals due to the useless or inoperative portion of the modulator disc. After this second selector the signal is passed through a peak demodulator 78 which of the input signal maintains only a short pulse corresponding to the maximum of the output signal from selector 77, this short pulse becoming effective at the time when a capacitor charged with the preceding signal and discharged slowly in a bleeder of relatively high value is recharged periodically as a fresh maximum of the signal appears for a given position of the modulator disc. This single pulse thus selected is subsequently amplified at 79 and synchronizes a monostable multivibrator 80. The latter produces a signal of fixed duration which is chopped at 81 for showing only an abrupt rise differentiated in the next circuit element 82. Thus, the latter produces very short pulses for synchronizing the circuit 83 of the flashing lamp 25 illuminating the scales carried by the modulator disc.

The aggregate effect resulting from this circuit is that the monostable multivibrator and the flashing lamp are synchronized by photoelectric signals of different shapes which are constantly reduced to a single pulse occurring exactly when the photoelectric signal has its minimum value due to the substantially uniform equality of the width of the wire image, on the one hand, and of one pitch of the modulator disc formed with slots of variable width, on the other hand. Under these conditions, the illumination of the flashing lamp will cause the number corresponding to the dimension of the measured object to appear through the reading gate and behind the pointer.

With the assistance of an adjustable pointer as already set forth hereinabove an additional scale may also be provided to show the percentage of relative variation in the width of the measured object.

In a practical and exemplary embodiment of the measuring device of this invention the different component elements of the circuitry may be given the following values set forth in the following list (see the diagram of FIG. 27):

LIST

*Resistors*

[$k\Omega$]

| | |
|---|---|
| $R_1$—1,000 | $R_{22}$—0.68 |
| $R_2$—10 | $R_{23}$—110 |
| $R_3$—100 | $R_{24}$—200 |
| $R_4$—82 | $R_{25}$—1 |
| $R_5$—1,000 | $R_{26}$—150 |
| $R_6$—5.6 | $R_{27}$—200 |
| $R_7$—100 | $R_{28}$—1.5 |
| $R_8$—390 | $R_{29}$—15 |
| $R_9$—56 | $R_{30}$—5.6 |
| $R_{10}$—1 | $R_{31}$—20,000 |
| $R_{11}$—300 | $R_{32}$—1,000 |
| $R_{12}$—1 | $R_{33}$—66 |
| $R_{13}$—200 | $R_{34}$—15 |
| $R_{14}$—100 | $R_{35}$—220 |
| $R_{15}$—1 | $R_{36}$—1.5 |
| $R_{16}$—150 | $R_{37}$—110 |
| $R_{17}$—470 | $R_{38}$—470 |
| $R_{18}$—1 | $R_{39}$—240 |
| $R_{19}$—100 | $R_{40}$—470 |
| $R_{20}$—390 | $R_{41}$—10 |
| $R_{21}$—240 | $R_{42}$—4.7 |

LIST—Continued
Resistors—Continued
[kΩ]

| | |
|---|---|
| $R_{43}$—15 | $R_{65}$—15 |
| $R_{44}$—5.6 | $R_{66}$—100 |
| $R_{45}$—10,000 | $R_{67}$—5.6 |
| $R_{46}$—2.2 | $R_{68}$—270 |
| $R_{47}$—1.5 | $R_{69}$—47 |
| $R_{48}$—100 | $R_{70}$—20 |
| $R_{49}$—82 | $R_{71}$—330 |
| $R_{50}$—1.5 | $R_{72}$—1,000 |
| $R_{51}$—47 | $R_{73}$—1,500 |
| $R_{52}$—47 | $R_{74}$—47 |
| $R_{53}$—470 | $R_{75}$—470 |
| $R_{54}$—240 | $R_{76}$—470 |
| $R_{55}$—470 | $R_{77}$—100 |
| $R_{56}$—10 | $R_{78}$—5 |
| $R_{57}$—22,000 | $R_{79}$—47 |
| $R_{58}$—2.2 | $R_{80}$—6.8 |
| $R_{59}$—110 | $R_{81}$—5 |
| $R_{60}$—110 | $R_{82}$—3.4 |
| $R_{61}$—2.2 | $R_{83}$—50 |
| $R_{62}$—470 | $R_{84}$—20 |
| $R_{63}$—470 | $R_{85}$—1,000 |
| $R_{64}$—150 | |

Capacitors

| | |
|---|---|
| $C_1$—16 μf. | $C_{22}$—250 nf. |
| $C_2$—16 μf. | $C_{23}$—16 μf. |
| $C_3$—1 nf. | $C_{24}$—0.1 μf. |
| $C_4$—50 μf. | $C_{25}$—10 nf. |
| $C_5$—0.1 μf. | $C_{26}$—2.5 nf. |
| $C_6$—1 nf. | $C_{27}$—6.1 μf. |
| $C_7$—2 nf. | $C_{28}$—2 nf. |
| $C_8$—8 μf. | $C_{29}$—50 nf. |
| $C_9$—0.1 μf. | $C_{30}$—10 nf. |
| $C_{10}$—1.2 nf. | $C_{31}$—0.1 μf. |
| $C_{11}$—1.2 nf. | $C_{32}$—10 nf. |
| $C_{12}$—3.2 μf. | $C_{33}$—16 μf. |
| $C_{13}$—16 μf. | $C_{34}$—20 nf. |
| $C_{14}$—50 nf. | $C_{35}$—25 nf. |
| $C_{15}$—10 nf. | $C_{36}$—10 pf. |
| $C_{16}$—250 nf. | $C_{37}$—20 pf. |
| $C_{17}$—100 nf. | $C_{38}$—50 nf. |
| $C_{18}$—50 nf. | $C_{39}$—16 μf. |
| $C_{19}$—16 μf. | $C_{40}$—64 μf. |
| $C_{20}$—500 pf. | $C_{41}$—2 μf. |
| $C_{21}$—50 nf. | $C_{42}$—500 pf. |

Diodes $D_1$–$D_2$–$D_3$–$D_4$–$D_5$ _____ OA85

Tubes $L_1$ _____ CK5702
$L_2 L_3 L_4$ _____ EF41
$L_5$ _____ EB41
$L_6 L_7 L_8 L_9$ _____ } ECC40
$L_{10} L_{11} L_{12}$ _____ }
$L_{13}$ _____ NSP.1

The flashing lamp may be energized during a very short time period consecutive to the reception of a minimum photoelectric signal as hereinabove, notably by using a monostable electronic multivibrator of the short and fixed cycle type.

This lamp may also be energized through the medium of a bistable multivibrator during a longer time period situated either between the beginning of the cycle of rotation of the measuring disc and the moment at which the minimum photoelectric signal takes place, or between this latter moment and the end of the cycle. In this case, the mean current fed to this lamp or the mean current of an auxiliary photoelectric cell illuminated by this lamp will show directly the average value of the measurement and may be used as such for the reading of the average dimension on an instrument for example of the movable frame type (which may follow a circuit having an adequate and adjustable time constant). The bistable multivibrator may be released by the minimum photoelectric signal on the one hand and by an electrical signal auxiliary of the beginning or the end of the cycle released by an optical signal resulting from the passage, in front of a photocell, of a slot or an opaque zone of the rotating disc, or by a commutator driven bodily with this disc.

The flashing lamp or lamps may also be fed with an alternating or pulsating current generated by an oscillator or issuing directly from the photoelectric current of the cell of the measuring device. Their intermittent illumination may be either caused or discontinued completely when the minimum photoelectric signal appears.

By using a device of this character it is possible to effect the remote reading of the measurement results under conditions similar to those contemplated hereinabove and also in another manner whereby the device is made considerably independent of variations in the conditions in which it is energized, due to the transmission of the alternating or pulsated current produced thereby and also to the integration of the pulses constituting this current in an electron computer or totalizer comprising means for automatically resetting it upon completion of each cycle of measurement (these resetting means being controlled for example by the signal corresponding to the end of the cycle as explained hereinabove).

The reading of a mean value of the fast-varying indications of an apparatus utilizing the means set forth hereinabove may be facilitated by causing a phosphorescent screen to be illuminated by the measuring device (the flashing lamp producing in this case an invisible radiation for example of the ultra-violet type) as the phosphorescent trace when observed causes a strong visual persistence.

A remote reading of the measurement effected by the apparatus may also be made by providing a disc or drum driven in synchronism with the measurement disc and illuminated by the flashing lamp energized through the medium of a suitable conductor.

This disc or drum may be driven by utilizing either synchronous motors or a synchronization of the "phase resetting" type controlled by the photoelectric pulses of the apparatus, or by auxiliary periodic signals originated once per measurement cycle by an auxiliary photocell illuminated through a slot of the measurement disc or by a commutator driven by this disc.

When a remote reading system is contemplated the switching from one range of measurement values to another in the apparatus, which may require several operations such as changing the graduated scale, displacing one or more elements of the optical system, etc., may be obtained by using remote control means of mechanical, electrical or other type actuated from the operator's place.

The detection of the discrepancy existing between the magnitude measured by the apparatus and a predetermined fixed value or an overstepping of a preadjusted dimension of the measured object (considered as a "standard" value) may be effected by means of an auxiliary photocell receiving through a diaphragm or measuring gate of adequate and adjustable positions and shape, which is situated near that point of the scale where this preadjusted dimension appears the illumination caused by the flashing lamp or the rotating "reference mark" illuminated by this lamp. This cell may cause the reaction of a monostable electron multivibrator or a relay circuit, and may be used for causing any adequate automatic reaction such as the release of an alarm signal, actuation of the stop-motion in a machine forming the insulating sheath or coating of a cable, the change of speed of this machine, etc.

If desired, an indication of the mean value of the positive or negative discrepancy between the measured magnitude and a pre-adjusted dimension shown for example by a simple measuring instrument of the movable frame type may be obtained by arranging an auxiliary cell in front of an adjustable measuring window or gate which may be located beyond the mark of the pre-adjusted dimension. In this case, the auxiliary cell will actuate a simple electronic or mechanical integrator, or a circuit having a suitable time constant and adequate adjustment means.

These values of the discrepancy or excess in relation to the pre-adjusted dimension (notably in composing the mean value thereof, may be utilized with a "compensated" magnitude by giving to the diaphragm or gate illuminating the aforesaid auxiliary cell a variable width or a locally variable transparency along the path of the reference mark covered thereby, therefore as a function of the magnitude of the discrepancy between the momentary indication and the pre-adjusted dimension. The same effect may be obtained by extending the "ON" time of the lamp (in this case a special lamp responsive to this end for example to a monostable multivibrator) and integrating the direct photoelectric current (or the current delivered by a bistable multivibrator controlled thereby) from a cell disposed behind a rectangular "gate," the duration of the input signal under these conditions being proportional to the dimensional difference.

The "measuring gates" disposed in front of the cells in the manner specified hereinabove may be arranged on the reading scale proper or on an auxiliary path also followed by the luminous spot (or an auxiliary mark) located notably on the opposite side of the half-circle on which the measured magnitude is shown visually (this mode of indication being omitted if desired on apparatus equipped with devices of this character).

As a specific form of application of the devices described hereinabove, the use of a first photocell detecting the overstepping of a dimension lower than the preadjusted dimension and of another cell generating an electrical voltage proportional to the mean value of the magnitude by which a dimension greater than the pre-adjusted dimension was overstepped may be contemplated. Such data are particularly useful with a view to adjust the parameters occurring during the manufacture of cables. When the measurement indicates a magnitude inferior to the pre-adjusted dimension this means that the insulating sheath is insufficient at the point of measurement and this want must be detected irrespective of its duration, whereas the overstepping of the higher limit of a pre-adjusted standard will only indicate an increase in the quantity of insulating material constituting the sheath, which quantity must be reduced; thus, this overstepping is effective by its mean value, not by its instantaneous or momentary value.

Measurements of this character may be used directly for automatically controlling the adjustable parameters or factors intervening during the manufacture of a wire or cable and having a direct influence on the diameter of the product; a typical example of a parameter of this kind is the linear speed of the wire or cable.

Thus, the measurement of the mean value by which the upper limit of the pre-adjusted standard dimension (for example the diameter of a cable or the electrical voltage proportional thereto) may be used according as it is higher or lower than a certain limit for controlling the direction of rotation of a motor acting directly or indirectly on the velocity of travel of the wire or cable. This value at which the direction of rotation of the auxiliary motor is reversed constitutes a "manufacturing standard" based on a previous experience taking due account of the frequency and magnitude of the fortuitous cases in which the requisite lower limit of insulation was overstepped.

This "standard" itself may be rendered adjustable automatically as a function of the data supplied by a device indicating notably by means of electric pulses the frequency and recurrence of the cases in which a predetermined minimum dimension close to the aforesaid lower limit was overstepped (detection of the direct or "compensated" value of overstepping).

This device may comprise a cell adapted, as already explained, to actuate an electronic trigger or monostable electron multivibrator, or a relay circuit adapted to extend the duration of the photoelectric pulse and to start a motor driving through the intermediary of a stepdown gearing the sliding contact of a potentiometer the adjustment of which acts up the "standard" contemplated. Moreover, this potentiometer is actuated in the reverse direction with a very slow motion obtained either by virtue of the direct energization of the aforesaid motor with a current of opposite direction, or by causing the low-frequency recurrence of pulses (generated at spaced time intervals for example from a suitable timing device) of a direction opposite to that of the pulses generated by the device detecting the overstepping of the minimum dimensional value. Under these conditions and as a function of the inherent characteristics of the installation, the products or materials utilized, etc., an automatic adjustment of the "standard" value takes place at the minimum value consistent with the observance of the requisite conditions, for example the continuity in the insulating capacity of a cable.

More generally, measurements of the different functions of the diameter as contemplated hereinabove may be used in conjunction with those factors, among others, by which the characteristics of the object, for example a cable, may be influenced during its manufacture, for automatically controlling in an electronic or electromechanical device the different adjustments by which the parameters controlling the various characteristics of this object, for example its linear speed or rate of feed, the temperature of the material constituting the insulation of a cable, for example, etc., may be influenced.

The apparatus according to this invention may be designed on the one hand for measuring the mean values of the diameter or of the apparent width of the fixed or movable objects, as well as certain statistical characteristics of their variation and, on the other hand, for utilizing the result of these measurements with a view to maintain these elements to a constant value during the manufacture of wires, cable or other objects the requisite characteristics of which are determined by a statistical function of the overstepping of their dimensions in comparison with a fixed value.

The measurement device proper may be embodied in a considerably simplified form by using a slotted disc of fixed "pitch," the latter being relatively close to the width of the image of the wire or tape to be measured. The photoelectric signal produced by this apparatus is restored to a constant amplitude by an electronic chopping circuit. Its duration is proportional to the difference between the dimension of the measured object and a fixed value. The signal integrated in a suitable circuit produces a voltage subject to linear variations, wherein the maximum corresponds to the local value of the dimension to be measured. By integrating this last-mentioned voltage in a so-called "peak-demodulator" circuit having a high time constant its average value may be stepped up.

Electronic devices, for example diode-type "amplitude selectors," when applied to this linear variation signal, may constitute efficient means for detecting the overstepping of a fixed value by the measured magnitude and controlling as a function of the detected excesses the manual or automatic adjustment of the devices to which the dimensions of an object are responsive during its manufacture, with a view to maintain these excesses to constant values in relation to a predetermined dimension.

The slots or like apertures formed in the rotary disc may be narrow in relation to the width of the image of the object to be measured. The image of these slots may also be used for controlling the illumination of the object to be measured. Instead of being formed along the periphery of a disc, these slots or apertures may be fixed or reduced to a single one. The image of diaphragm formed with this or these apertures, or the image of the object to be measured is displaced cyclically relative to this diaphragm by causing the luminous beam to be reflected by an oscillating mirror. The same effect may be obtained by illuminating the object to be measured by means of the image of the movable spot of a "flying-spot" type cathode ray tube.

In addition to the means broadly set forth hereinabove, the width of the object may be measured by determining in a suitable electrical circuit the difference in the instantaneous or momentary value at the beginning and at the end of the photoelectric signal of an auxiliary voltage varying linearly with the displacement of the image of the slot, the scanning spot or the measured object. This voltage may be either derived from the sweep voltages of the cathode ray tube or generated or controlled by a modulating element operatively connected to the oscillating mirror, for example in the form of a blade adapted partially to block or intercept an auxiliary light beam impinging on an auxiliary cell, or the disc or plate of a variable capacitor inserted in an alternating voltage divider, or a coil displaced in the field of another coil, etc. The beginning and the end of the differentiated photoelectric signal are used for releasing two "gates" transmitting with opposite polarities the instantaneous values of these auxiliary voltages to an integrating capacitor the final charge of which is therefore proportional to the width of the measured object.

The reading of the average values and statistical characteristics of the overstepping of certain limit dimensions of a tape, cable or wire manufactured beforehand, or the actual control of a machine by which these articles are manufactured, both as a function of the variation in the mean dimensions and statistical values of the overstepping of their local dimension with respect to a critical dimension, may be effected by means of the devices described hereafter.

In the apparatus provided with a rotating disc having multiple slots of variable "pitch," another, wider transparent slot (or two such slots disposed in different annular zones) is (or are) disposed beyond the annular region occupied by the original slots. On one side of these slots one or two auxiliary photocells, and on the other side one or two luminescence or filament lamps, are arranged. The photocell or photocells, the lamp or lamps, or both, are mounted on an arm pivoted about the axis of rotation of the disc and may be driven manually or automatically by displacing at the same time in front of a pointer a drum carrying one or more graduated scales; the switching from one to the other of these scales may be effected for example by using a movable mask operated in synchronism with the means for switching the ranges measurement permitted by the apparatus.

Each auxiliary photocell produces a signal of a phase depending on the angular position in which the arm is set. On the other hand, a signal of different phase is generated by the electrical device of the apparatus during the rotation of the movable disc when the width of the image of the measured object becomes substantially equal to that of one slot of the modulator disc. The time interval separating these two phenomena gives the value of the difference between the local dimension of this object and a pre-adjusted value determined by the positioning of this arm. Electric voltages corresponding to this time interval and notably proportional thereto may be produced by using the following means:

The signal controlling the energization of a flashing lamp is used for either illuminating the aforesaid auxiliary luminescence or filament lamps or releasing a monostable or bistable multivibrator generating a constant-amplitude, variable-phase extended signal. On the other hand, the auxiliary photocells, when illuminated as a consequence of the passage of the slots formed in the annular portion of the disc before which they are placed, will also generate signals having a given duration and a fixed amplitude, either directly or through the medium of the electron multivibrator actuated thereby. The slots may be relatively long in order directly to determine the illumination time (which may be constant or variable as a function of the width or transparency of the slots) of these cells, or narrow and single for each cell so as to release a signal from a monostable multivibrator by illuminating this cell, or narrow and double so as to release through two photoelectric signals the beginning and the end of an oscillation of a bistable multivibrator, or relatively wide and adapted to control this multivibrator under the influence of the beginning and the end of the electrically differentiated photoelectric signal produced thereby.

The two above-mentioned signals are generally time-shifted and owing to their specific composition they are adapted to yield a single resultant signal the duration of which represents the time elapsing from their beginnings to their ends, and, therefore, for a suitable angular displacement of the slots and of the aforesaid pivoted arms, the magnitude to be measured.

According to a first modified form of embodiment these two signals are composed electrically and given opposite polarities, and by a chopping operation effected for example by means of a diode, the differential signal is obtained which separates the beginnings of the two signals. According to a further embodiment, it is possible to use one of these signals (which may be relatively short) for stopping the other one (in the case of a bistable multivibrator) or controlling its transmission through an electron "gate," which produces the same effect, or finally switching this signal between two circuits while reversing its sign in one of these circuits, thus enabling the subsequent opposition of the signals at the output end of these circuits to be effected after their integration.

The amplitude of the signals produced in these circuits may be reduced to a fixed value by an electron chopper or limiter. They may subsequently be subjected to an integration to yield a signal (or two signals of opposite polarities in case two contactors or auxiliary cells are used) characterized by a linear variation, their amplitude representing the difference between the dimension to be measured and a fixed value. These voltages may be produced by a single cell device or, as suggested hereinabove, by a pair of cells for which the corresponding slots of the disc are shifted angularly and for which, therefore, the signals have durations varying in the reverse direction and having opposite polarities. The electrical composition of these two signals is such that the voltage differences proportional to the difference between the measured magnitude and the fixed value can be defined in relation to the "ground" potential and shown on a measuring instrument.

The voltages thus obtained may then be integrated in a peak demodulator of fixed or adjustable time constant, notably by the switching of resistors and capacitors, in order to produce a slowly variable indication of the mean value of the measured dimension or of the excess in relation to a pre-adjusted value of this measured voltage.

The first voltage thus obtained, which represents in relation to an initial adjustment the difference between the measured magnitude and the mean value, may be used for controlling factors determining the apparent diameter or width of a wire, cable or tape during their manufacture, notably by varying the speed of a winch driving or winding a cable as it is manufactured.

The other one of the two voltages defined hereinabove and formed in a device similar to those described herein but in which the slot, cam or contact of the rotating disc have a predetermined angular setting relative to the movable arm supporting the contactor, the auxiliary cell or the lamps, permits of reading only data corresponding to the overstepping of a certain value lower or higher than the mean value. Its duration may either vary according to the magnitude of this overstepping or be fixed and issued from a narrow slot and transformed for example by a monostable multivibrator producing a signal of fixed duration released by the auxiliary signal, in order to produce in a capacitor the integration of a charge depending only on the frequency at which a given dimension is overstepped, without depending on its amplitude, whereas in the embodiment suggested and defined hereinabove this charge depends both on the frequency and on the magnitude of these oversteppings. Thus, a statistical measurement of the excesses will be obtained which is either "direct" or "compensated."

These last-mentioned data may be utilized directly for automatically controlling the variation in the dimension of the manufactured object, or indirectly for altering the adjustment by setting the movable arm of a device described hereinabove for measuring the mean dimension of a cable or tape during its manufacture, in order to maintain these data to a fixed value. This effect may also be obtained automatically by causing this arm to be driven through the medium of a motor associated with a relay for reversing its direction of rotation, this relay being contolled by the voltage representing the statistical discrepancy in the dimensions. Under these conditions and given a previous adjustment of the voltage necessary for causing the reversal of this relay and corresponding to a predetermined value of the statistical function contemplated, the mean diameter is maintained initially to a pre-adjusted value and is subsequently altered in one or the other direction according to the variation of this statistical measurement, so that the value of this measurement will remain fixed in spite of possible variations in the conditions of manufacture which depend on the material, the adjustment and mechanical condition of the machine which are likely to interfere with the dimensions of the object during its manufacture.

The reversal of the direction of rotation of the motor produces a gradual shift in the drum of the arm operatively connected to the device for measuring the average diameter which, if this care were not taken, would only be stopped when the modification of the adjustment of the machine causes a variation in the statistical resultant of the dimensions of the manufactured object which determines the direction of rotation of the motor. If the machine drive is slowed down so that only mean values integrated during a sufficient time period may be effective, this device may produce a very slow stabilization becoming effective only after the occurrence of oscillations of a certain duration. This duration may be reduced if desired by altering in the proper direction the charge of the integrating capacitor provided in the device for measuring the statistical excesses or oversteppings, which device is actuated by the above-mentioned relay under the direct influence of the very rotation of the motor, so that, for each discrepancy in the charge of this capacitor which is caused by the modification of the statistical value to be compensated, this motor will effect only a number of revolutions substantially proportional to this discrepancy. To this end, a cam-actuated switch controlled for example by this motor is adapted periodically to feed to this capacitor a predetermined quantity of electricity of a polarity depending on the direction of rotation of the motor. Thus, this switch may cause auxiliary, low-value capacitors alternately to contact now a source of voltage which is the same as that from which the motor is energized (i.e. a voltage of which the polarity changes with the direction of rotation of the motor), now the aforesaid integrating capacitor either directly or through the medium of a reversing relay.

In order to avoid the effect resulting from the phase displacement of the photoelectric signals which is due to the oscillation of the object to be measured and may detrimentally affect notably the indications concerning the value of the statistical overstepping, the periodic voltages which, when integrated according to the alternate forms of embodiment suggested hereinabove, permit the representation of the mean measurement or of its statistical overstepping, may be derived from circuits adapted to count or totalize the number of photoelectric pulses obtaining from the beginning of the rotating disc scanning cycle and the moment where the monostable multivibrator is synchronized by the minimum photoelectric signal. The values thus totalized which represent notably in the form of proportional electrical voltages the local dimensions of the measured object are transmitted through gates released by the multivibrator synchronized on the minimum photoelectric signal to the integrating circuits representing the average measurement and that of the statistical overstepping.

In order to effect a "spreading" of the measurement but in one portion only of the total measurement range permitted by the rotating disc, a fixed but adjustable quantity of pulses may be deducted to maintain only the effect of those in excess of this quantity; alternately, a periodic discharge of predetermined value of a totalizing capacitor may be effected, besides it is possible to introduce a threshold of amplitude from which only its voltage representing the measured value may be transmitted to the integrating capacitor.

For the same purpose, one may also use cyclical totalizers adapted to be reset automatically to their minimum initial value when their maximum value is overstepped (for example after ten successive charges).

To this end, one may use decade totalizers or a capacitor-type totalizing circuit wherein a first capacitor is charged by photoelectric pulses restored to a fixed amplitude or releasing an intermediate monostable multivibrator producing signals of fixed duration and amplitude. When, after a certain number of these charges, its voltage exceeds a certain limit, it releases a Schmitt multivibrator adapted on the one hand to cause its full discharge and on the other hand to transmit a pulse to the second totalizing capacitor similar to the first one. The two capacitors are discharged by the monostable multivibrator synchronized by the minimum photoelectric signal which is adapted at the same time to transmit through two gates their momentary charges to a pair of integrating capacitors in circuits having a high time constant and controlling two measuring instruments, one indicating the "spread" values and the variations occurring in the mean dimension, the other the partial "range" of the measurement by a series of discontinuous values having a fixed difference, to which series the "spread" values must be added.

The integrating circuit corresponding to the capacitor of the "spread" totalizer represents directly the variations in the mean dimension and may actuate a reversing relay having a reversible threshold of reversal for controlling the variation in the width of the object measured during its manufacture. This threshold may be indicated by a pointer displaced by the adjustment member in front of the scale of the instrument for measuring the variation in the mean dimension. This member may also be driven from a motor device controlled by the measurement of the statistical overstepping according to the different forms of embodiment contemplated hereinabove.

This last-mentioned device may comprise an integrating capacitor similar to that producing the average measurement, except that it is charged only each time the value of the "spread" totalizer exceeds an adjustable limit corresponding to a critical dimension. This adjustment affects the reaction threshold of a "gate" which at the time of the synchronization transmits either the value of the excess of the totalizing capacitor charge with respect to the potential of this threshold or a fixed charge from a synchronized monostable multivibrator (for measuring the "compensated" or non "compensated" statistical overstepping) to the said integrating capacitor.

With a device of this character the measuring instrument provided for indicating the statistical characteristics of the overstepping or excess cannot be controlled directly by this capacitor. It may be doubled by another capacitor controlled in parallel but not subjected to the action of the aforesaid periodic discharges, this other capacitor being connected to a measuring instrument indicating the value of this statistical overstepping. The value of the voltage at which the direction of rotation of the motor takes place may be indicated in front of the scale of this instrument by a pointer driven in conjunction with the potentiometer by which it is adjusted.

The initial adjustment of the mean dimension for example during the manufacture of a cable, as well as the critical diameter and the value of the corresponding statistical overstepping, may be determined from an article or cable for example previously manufactured in the same device by taking its mean diameter in order to define an initial adjustment (with a view to fix up the requisite characteristics of use as defined by a "nominal" diameter which, if it were obtained with the maximum precision, would display these characteristics) as well as its characteristics of statistical overstepping as a function of the different (critical) values of the diameter. A couple of these last-mentioned values may then be introduced into the apparatus and notably the couple of these values at which the variation in this statistical characteristic as a function of the critical dimension is greater, thereby ensuring the maximum precision in the servo-action controlled by this apparatus.

Figure 28:
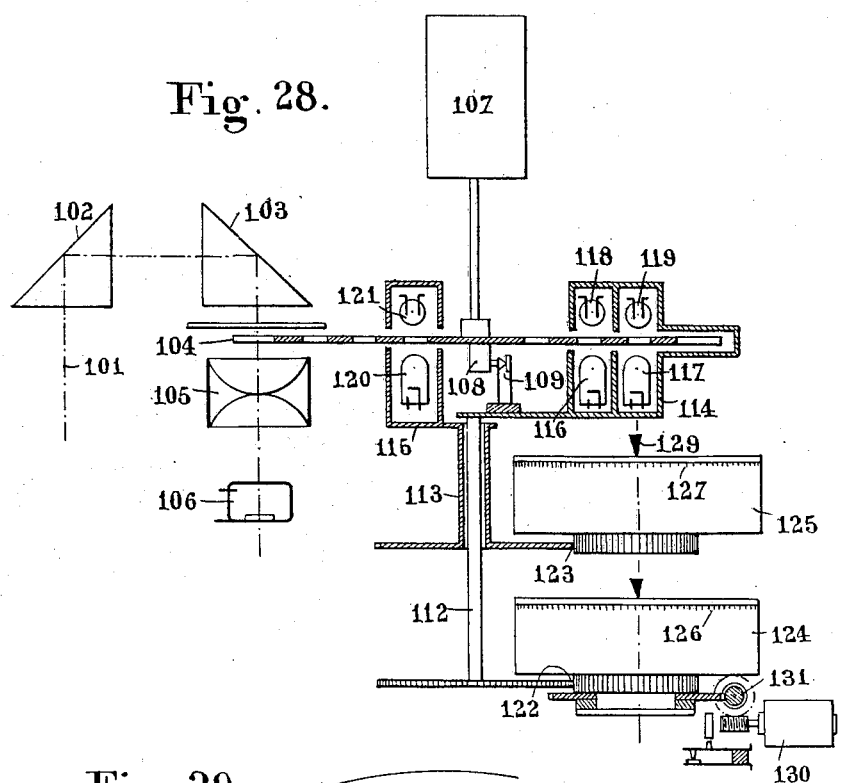
FIGURE 28 is an elevational view showing the optical and mechanical section of another device constructed according to the teachings of this invention.
Figure 29:
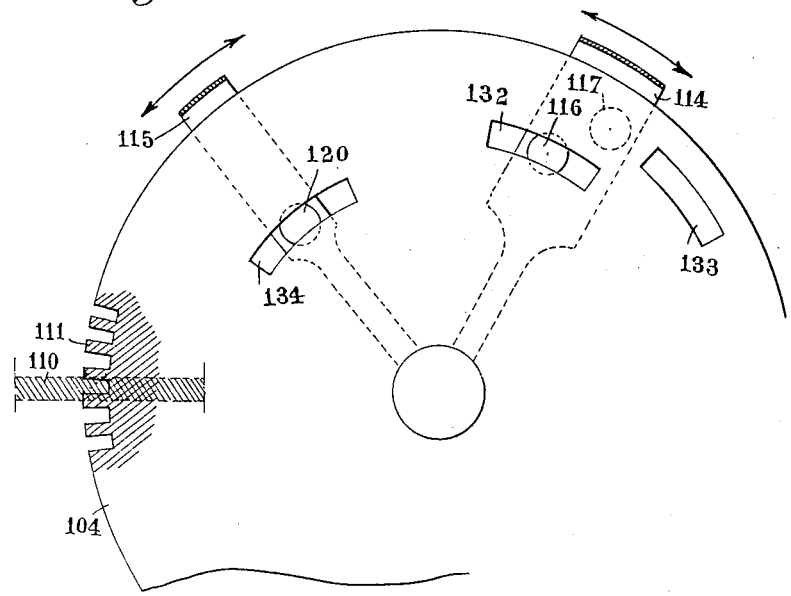
FIGURE 29 is a plan view of the device shown in FIG. 28.

In FIG. 28 the reference numeral 101 designates the axis of the beam co-acting in forming the image of the measured object after its reflexion by the two prisms 102, 103 on the surface of the rotating disc 104. This beam illuminates through the condenser 105 the cell 106. The slotted disc is rotatably driven from a motor 107 also drivingly connected to a cam 108 actuating in turn a contact 109 adapted to suppress the signal when the variation in width of the disc "pitch" changes abruptly. This disc is also shown in FIG. 29 wherein the wire image 110 projected onto one portion of the disc periphery 111 consisting of narrow slots or notches of unequal widths. In axial alignment with the motor axis are coaxial shafts 112, 113 carrying the arms 114 and 115 respectively. The arm 114 carries in turn two auxiliary photocells 116, 117 adapted to measure the mean dimension and illuminated by two filament or luminescence lamps 118, 119, the other arm also supporting on the one hand an auxiliary photocell 120 adapted to measure the statistical oversteppings, and on the other hand the corresponding lamp 121. The two shafts 112 and 113 are rotatably driven through gears 122, 123 and drums 124, 125 carrying scales 126, 127 movable in front of corresponding pointers 128, 129. These drums may be rotated manually by means of narrow knurled portions projecting from their outer periphery. In addition the drum 124 may be driven from an auxiliary motor 130 through a reducing gearing 131 and a friction coupling, as shown in FIG. 28, this motor being operated as a function of the value of the statistical overstepping of a critical diameter defined by a pre-adjusted value. The disc 104 comprises in addition to its peripheral portion 11 consisting of relatively narrow slots of variable pitch three other arcuated slots 132, 133 and 134 having the shape of portions of circular annuli, which are positioned in front of the different auxiliary cells and lamps at unequal distances from its center.

Figure 30:
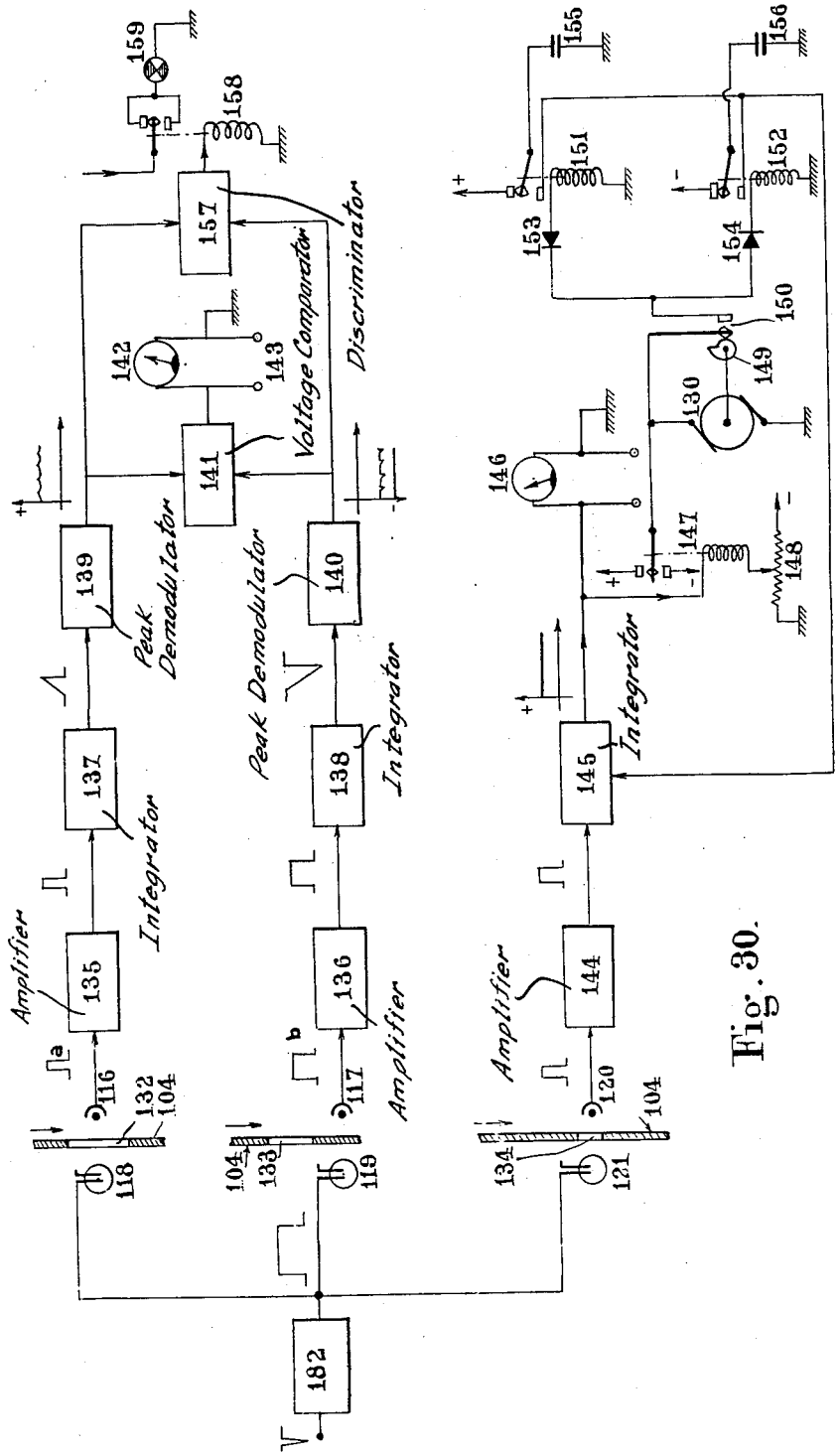
FIGURE 30 is a block diagram showing the principle of an electric circuit corresponding to this device.
Figure 31:
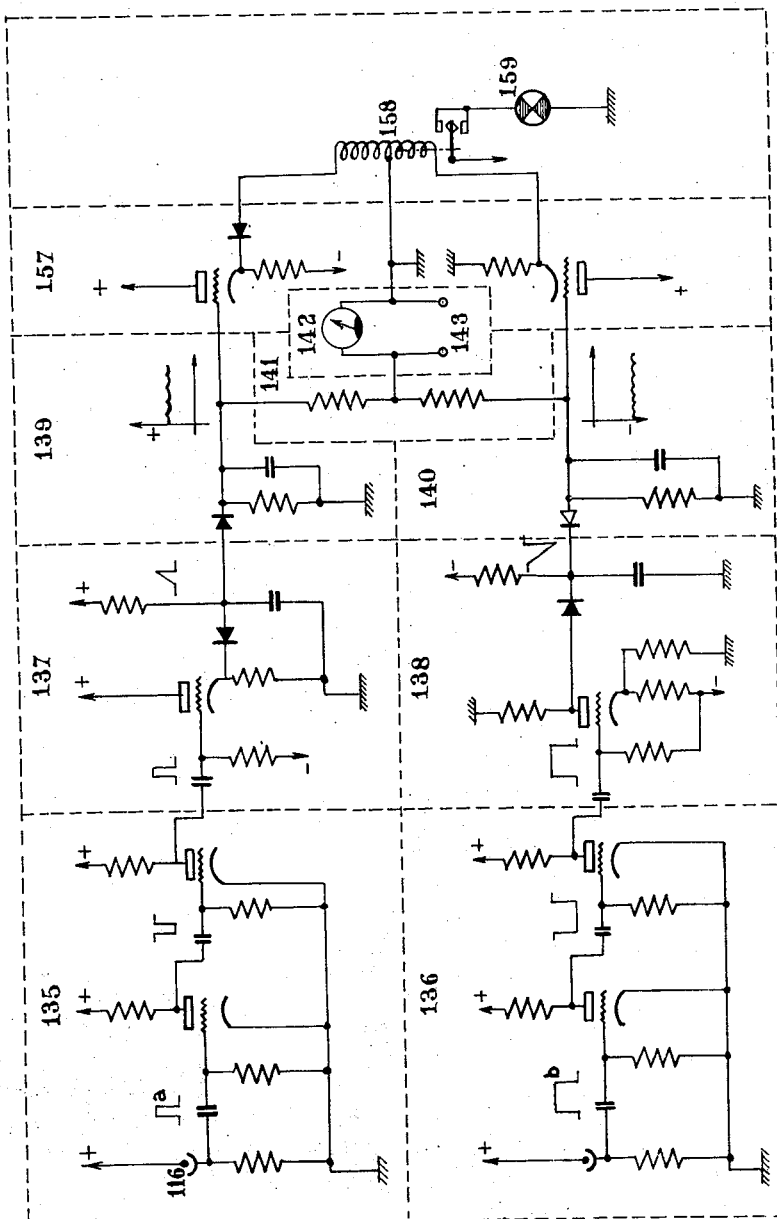
FIGURES 31 and 32 are electrical circuit diagrams concerning the apparatus shown in FIGS. 28 to 30.
Figure 32:
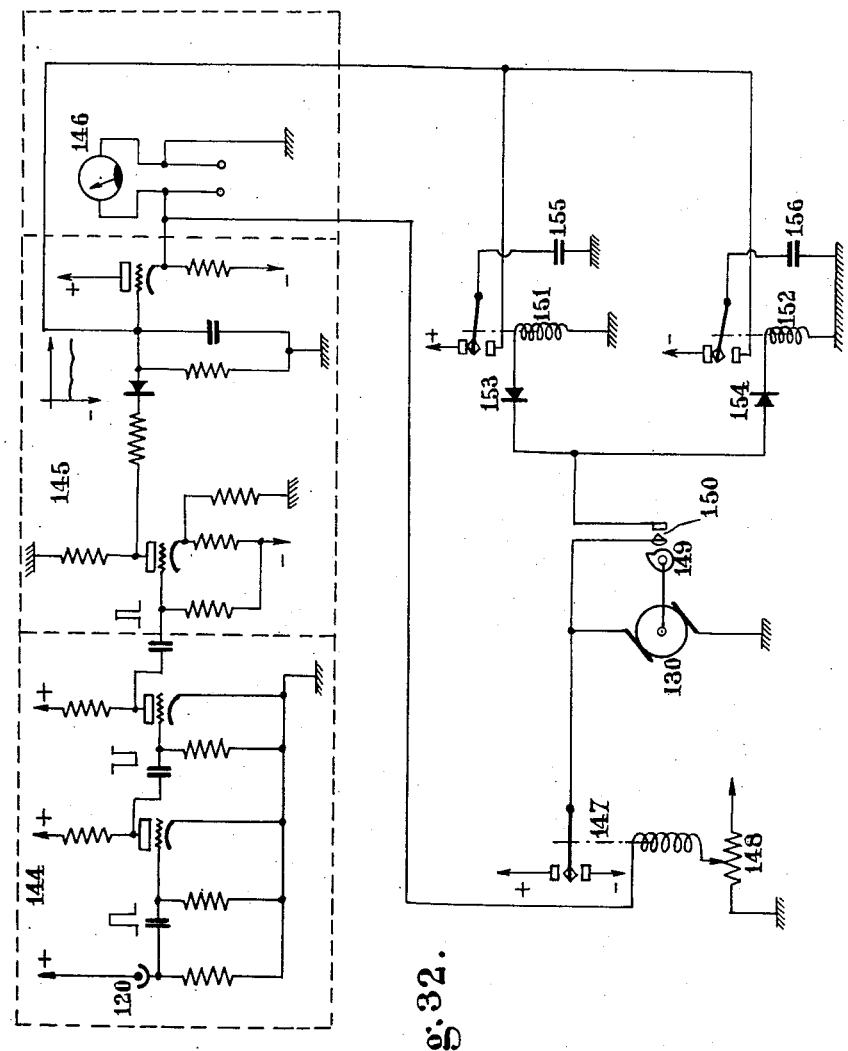

The photoelectric signals from the auxiliary cells are fed to the circuit shown in block form in FIG. 30 and more in detail in FIGS. 31 and 32. In this circuit the waveforms produced by the different elements are represented near and after each element. These elements shown in the form of spaced rectangles in the block diagram of FIG. 30 are contained within the dotted-line rectangles of FIGS. 31 and 36 designated by the same reference numerals.

In this arrangement the luminescence lamps 118, 119 and 121 are fed with the output pulses from a monostable multivibrator 182 released by the photoelectric signal emitted when the disc pitch is equal to the width of the image projected thereon. The slots 132, 133 and 134 are shown in a developed form between the corresponding lamps and cells.

When the width of the image differs from that for which the arm 114 carrying the cells 116 and 117 has been preset, these cells generate corresponding pulses such as $a$ and $b$. The relative duration of these signals is a function of the moment when the lamps 118 and 119 are energized, that is, of the width of the image.

The pulses $a$ and $b$ emitted by the cells 116 and 117 are amplified at 135 and 136 and subsequently integrated at 137 and 138 with voltages of opposite polarities. The integrated voltages will then actuate peak demodulators 139, 140 producing mean voltages proportional to their maximum amplitude. These demodulated voltages are opposed in the circuit 141 and control the deflection of the measuring instrument 142 indicating in relation to a central "0" (nought or zero) the variations occurring in the mean voltage. In addition, a voltage suitable for controlling the machine manufacturing the measured object, or a winch for driving or winding up a cable during its manufacture, is available across the terminals 143.

At the lower portion of FIG. 29 and also in FIG. 31 the auxiliary coil 120, the amplifier 144 of the photoelectric current produced therein and an integrator 145 having a high time constant and incorporating a capacitor the charge of which actuates the instrument 146 for measuring the overstepping of a pre-adjusted critical value, are shown. The same integrated voltage actuates either directly or through a separate integrating capacitor, a switching relay 147 for a value adjustable by means of the potentiometer 148 the shaft of which is adapted to drive at the same time a pointer (not shown) in front of the scale of the instrument 146. The auxiliary motor 130 is controlled by this switching means. Its direction of rotation will thus depend on the value of the statistical overstepping shown on the instrument 146 relative to the adjustment of the potentiometer 148. This motor drives a cam 149 actuating upon each revolution of its shaft a contact 150. This contact 150 controls one of the two relays 151, 152 according to the polarity of its voltage, and therefore to the direction of rotation of the motor, through diodes 153, 154 and causes through the medium of these relays the switching of one or the other of the auxiliary capacitors 155, 156. These capacitors supply charges of opposite signs to the integrating capacitor of device 145 and therefore cancel the variation in its charge which causes the motor to rotate, after a total number of revolutions of the motor which is proportional to this charge variation in order to effect a quicker stabilization of the servo-control means to which the manufacturing machine is responsive as already set forth hereinabove.

Moreover, the upper portion of FIG. 30 shows an auxiliary device whereby the measurement of the mean diameter may be extended by utilizing an indication of the pointer of the measuring instrument 142 varying in a direction opposite to the increase in this diameter when a predetermined limit is overstepped due to a gradual decrease in the signal produced by the device comprising the auxiliary slots and the auxiliary cells 116, 117, only one of these cells being illuminated in this case. This device comprises a discriminator circuit 157 actuating a relay 158 adapted, when one of the voltages delivered from the circuits 139 or 140 is absent, to light up a tell-tale lamp 159, thereby indicating that the reading on the measuring instrument must be effected on an additional scale of decreasing variation characteristic.

Figure 33:
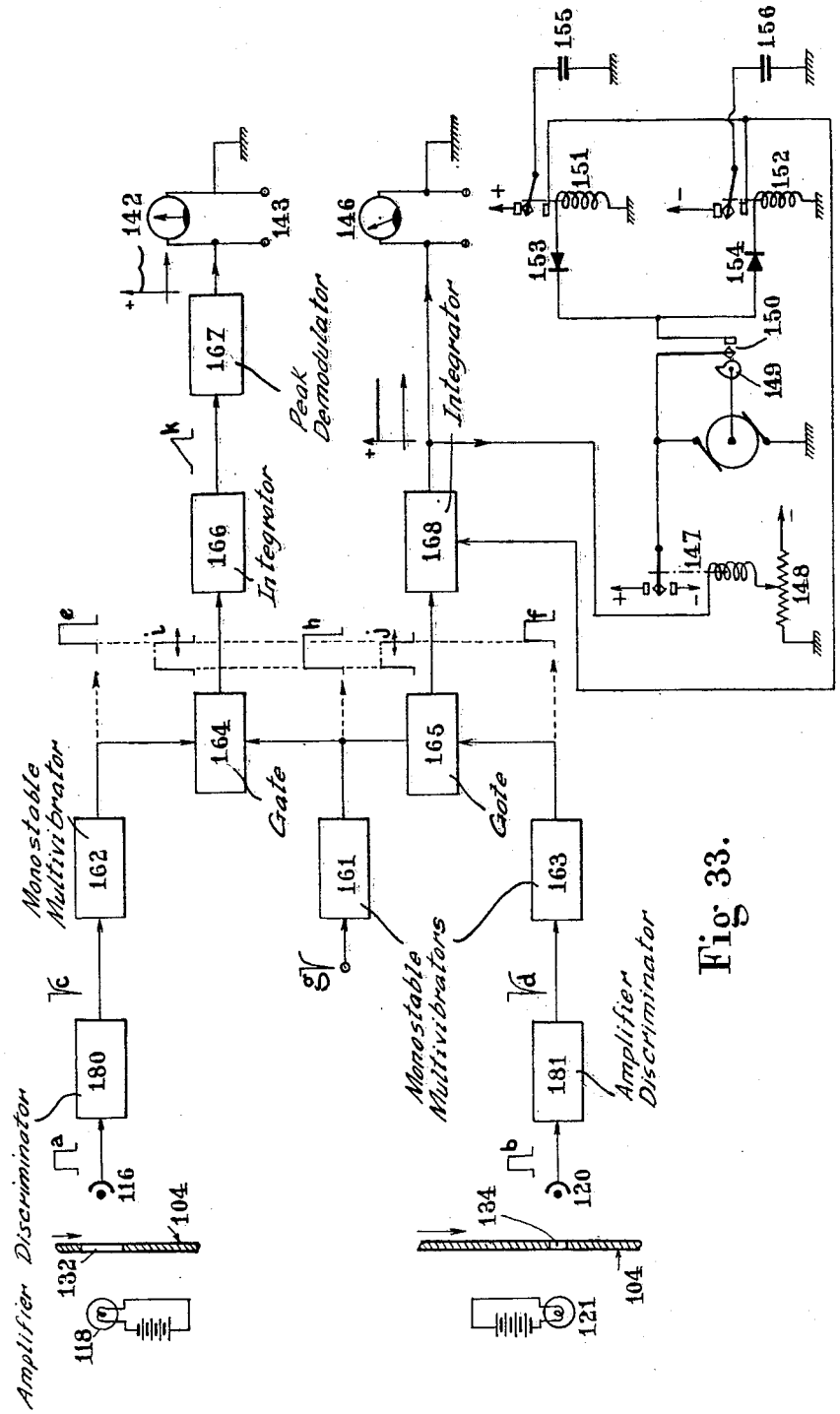
FIGURE 33 is a block diagram showing the principle of another form of embodiment of this electrical circuit.
Figure 34:
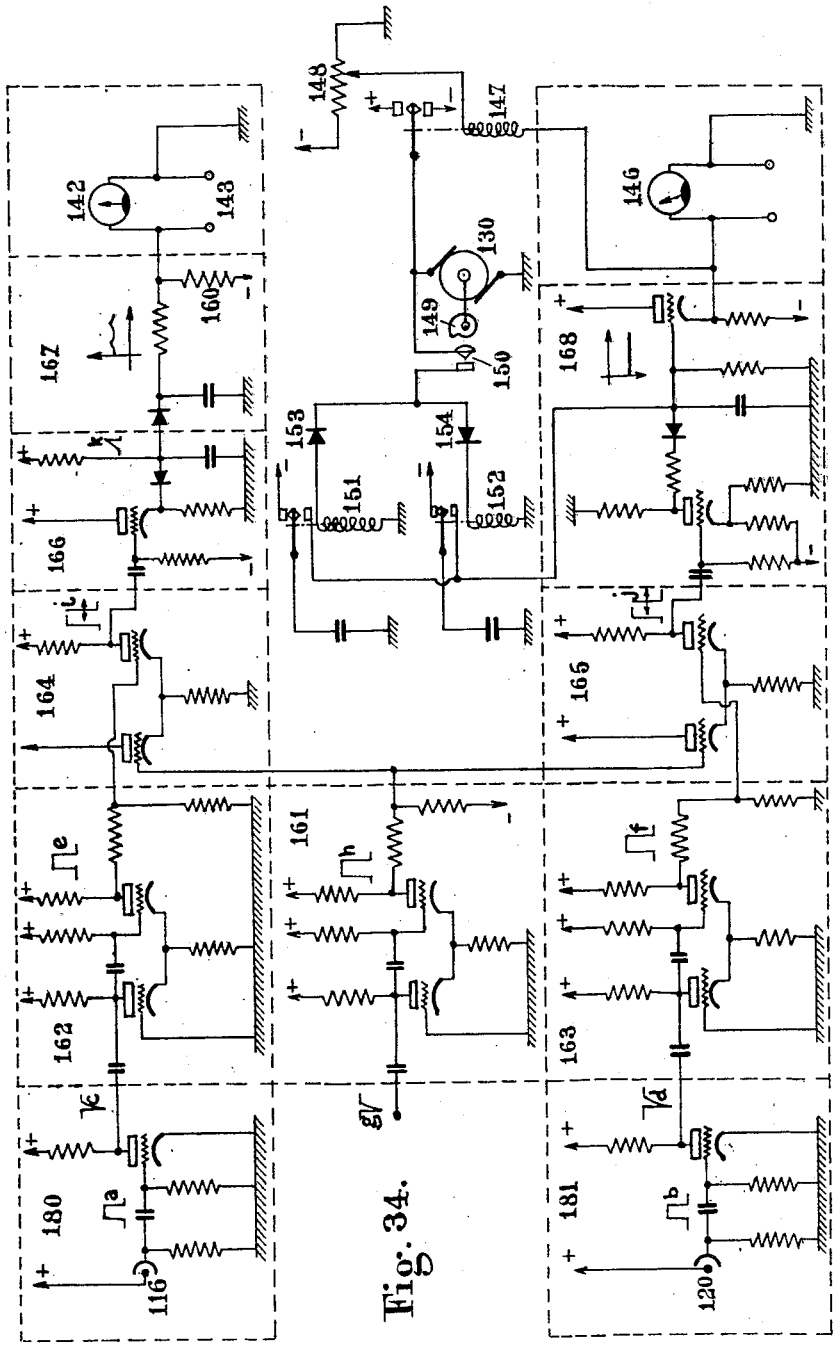
FIGURE 34 shows the electrical circuitry of this modified form of embodiment.

Another modification of these circuit arrangements is illustrated in FIGS. 33 and 34. In this modified form of embodiment only one auxiliary cell 116 is utilized for measuring the mean dimension (the variation of which is defined in relation to the central "0" of the measuring instrument 142 due to a fixed "counter-polarization" produced by means of the circuit 160), and illuminating the auxiliary cells 116 and 120 and the constantly energized filament (not luminescence) lamps 113 and 121. FIG. 33 illustrates diagrammatically the electrical circuit for transforming the signals from these auxiliary cells.

This last-mentioned circuit is utilized in conjunction with the mechanical device illustrated in FIGS. 28 and 29. It utilizes two signals from the monostable multivibrators, these multivibrators being synchronized the one by the first selected photoelectric pulse (as in the preceding mounting) but utilized directly without controlling the lighting of the luminescence lamps, and the other by the pair of auxiliary cells providing the first one 116 an indication of the mean dimension and the other one 120 the measurement of the statistical overstepping of this dimension in relation to a pre-adjusted value according to the procedure set forth hereinabove. This last-mentioned circuit may be followed by the device already described for damping out the oscillation of the assembly controlling for example a cable manufacturing machine.

Thus, in FIGS. 33 and 34 the auxiliary photocells 116 and 120 designed for accomplishing these two functions generate respectively when the slots 132 and 134 pass in alignment therewith pulses $a$ and $b$ fed to amplifying and discriminating circuits 180, 181 in which these pulses $a$ and $b$ are transformed into pulses $c$ and $d$ of shorter duration. The circuits 162 and 163 are those of the monostable multivibrators producing constant-amplitude pulses $e$ and $f$ respectively, of fixed duration, which are synchronized by the output signals $c$ and $d$ from the preceding circuits. The aforesaid pulses $e$ and $f$ are subsequently fed to the circuits 164 and 165 acting as "gates" controlled on the other hand by the signal $h$ produced by the monostable multivibrator 161 synchronized on the selected photoelectric signal $g$.

The signals $i$ and $j$ issuing from the gates 164 and 165 will thus have a duration proportional to the discrepancy between the local dimension of the measured object and two pre-adjusted values. The signal $i$ delivered by the gate 164 is integrated in the circuit 166 producing a linear-variation signal $k$. The output signal $k$ is subjected to a peak demodulation in the next circuit 167 actuating on the one hand the measuring instrument 142 indicating the mean dimension and, on the other hand, through the terminals 143, the servo-device controlling the machine by which the measured object is manufactured.

Besides, the signal $j$ issuing from the gate 165 is subjected to a detection of its mean value in a high time-constant circuit 168 giving through the medium of an amplifying tube and an instrument 146 an indication of the mean value of the oversteppings relative to a pre-adjusted dimension. The same voltage is also adapted to actuate on the other hand a damping device similar to the one described hereinabove with reference to FIGS. 30 and 32 and also shown in FIGS. 33 and 34.

In measuring the average values of the measured dimension and that of the oversteppings thereof by means of the devices described hereinabove a greater precision may be obtained with the slotted-disc apparatus than that corresponding to the difference in the measurements, represented by two adjacent slots of the disc, without however detrimentally affecting the stability of the measurements which results from its principle.

To this end, the conditions governing the synchronization effected by the photoelectric signal are so modified that if the measured dimension lies between two values corresponding to two adjacent slots or notches of the disc, this synchronization is effective now for one, now for the other of these two adjacent slots producing two signals in the form of photoelectric pulses having nearly the same amplitude, these pulses being selected together by an automatic-polarization selector at frequencies which are in inverse ratio to those represented by the aforesaid two slots, so that after the integration a continuously-varying mean voltage proportional to the measured dimenison is produced.

This effect may be obtained due to the frequent variation in the dimension of the measured object if this variation takes place, or under the influence of a periodic, low-amplitude variation of same character imparted to the image of the measured object by causing a periodic displacement of the measured object or of some elements in the optical system forming the image thereof, namely the optical lens system or the prism system by which the luminous beam is reflected, for example.

Moreover, also in order to provide the same effect an auxiliary signal giving the predominance now to one, now to the other of these two pulses may be superposed on the amplified photoelectric pulses. This auxiliary signal is not synchronized on the photoelectric signal. It may be alternating with a fixed amplitude or derived from a thermionic background noise source.

However, to yield a regular and accurate indication of the measured dimension, the auxiliary signal generator should be designed as follows:

It comprises a monostable multivibrator synchronized by the first one of the aforesaid two preselected adjacent photoelectric pulses and adapted to generate a signal of fixed or gradually varying amplitude which is electrically superposed on these two combined pulses before introducing same into the last synchronizing device (before the second "maxima selector"). It will be effective in systematically increasing the amplitude of the second photoelectric pulse in order to synchronize with the same frequency the other two pulses in case the width of the image of the measured object were equal to the arithmetical average of the two measurements corresponding to the two successive slots, thereby suppressing the predominance of the first pulse as far as its synchronizing influence on the next circuit is concerned. Another signal produced in an auxiliary generator not synchronized on the disc rotation has the form of a plurality of alternating oscillations having a linearly increasing or decreasing amplitude, its alternations corresponding approximately to the time interval elapsing between the two photoelectric pulses. This auxiliary signal is also superposed on these photoelectric pulses. Under these conditions, it is now the first pulse, now the second pulse that becomes coincident with a positive alternation whereas the other pulse is reduced due to the superposition of a negative alternation. As a result, the relative frequency of the synchronizations for one and the other of these two pulses is proportional to their amplitude difference, and therefore this frequency is the reverse of the discrepancy between the measured diameter and the two measurements corresponding to said two successive slots.

To prevent the auxiliary signal from lowering the polarization level of the selector circuits, this signal will be transmitted through a "gate" controlled by two photoelectric pulses.

A similar result may be obtained by adding through the medium of a circuit consistent with the voltages representing the local value or the mean value of the dimensions measured according to the methods set forth hereinabove a negative or positive corrective signal proportional to the amplitude difference between the two photoelectric pulses relative to the two slots contemplated hereinabove.

This circuit may comprise two monostable multivibrators, one synchronized on the first one of said pair of preselected photoelectric pulses as set forth hereabove, and adapted to synchronize the other multivibrator in turn, after a time period slightly inferior to the interval between the two successive pulses. These multivibrators act somewhat like electron "gates" transmitting the two signals with opposite polarities to one or two integrating capacitors, the differential voltage of these capacitors, which is proportional to the algebraic difference of the amplitude of these pulses, being superposed electrically on the output voltages of the apparatus.

To avoid the effect of the residual signal caused by the diaphragm and most likely, when superposed on the photoelectric signal, to compromise the fast variation of this signal in the region of its minimum where it is normally selected for synchronizing a monostable multivibrator, as explained hereinabove, and furthermore modify its amplitude as a function of the position of the object to be measured, the alternating voltages constituting the photoelectric signal are transmitted through two demodulating diodes and two circuits having the one a very low time contsant and the other a time constant of the order of the cycle of the photoelectric signal. The two output signals of opposite polarities are added electrically and transmitted through a gate released by the pulses of the photoelectric signal through the medium of a non-stable multivibrator synchronized on this signal. These signals actuate as a function of their polarity one or the other of the aforesaid two monostable multivibrators so adjusted that they are released the one as a consequence of the absence of positive signals and the other by the presence of negative signals. These release actions take place on the one hand, in the case of the first multivibrator, when the amplitude of the photoelectric pulses ceases from being lower than that of the preceding ones, and on the other hand in the case of the other multivibrator, when the first photoelectric pulses of an amplitude higher than that of the preceding ones occur. These two multivibrators produce in the load circuits similar to those described hereinabove two charges independent of the integrating capacitors, one of these charges beginning before and the other after the minimum photoelectric signal, the mean value of these charges corresponding to that of a single multivibrator synchronized on the minimum photoelectric signal, these conditions occurring even if this signal were not definitely differentiated from the adjacent pulses and if it displayed sudden variations as a consequence of the oscillation of the measured object.

Figure 35:
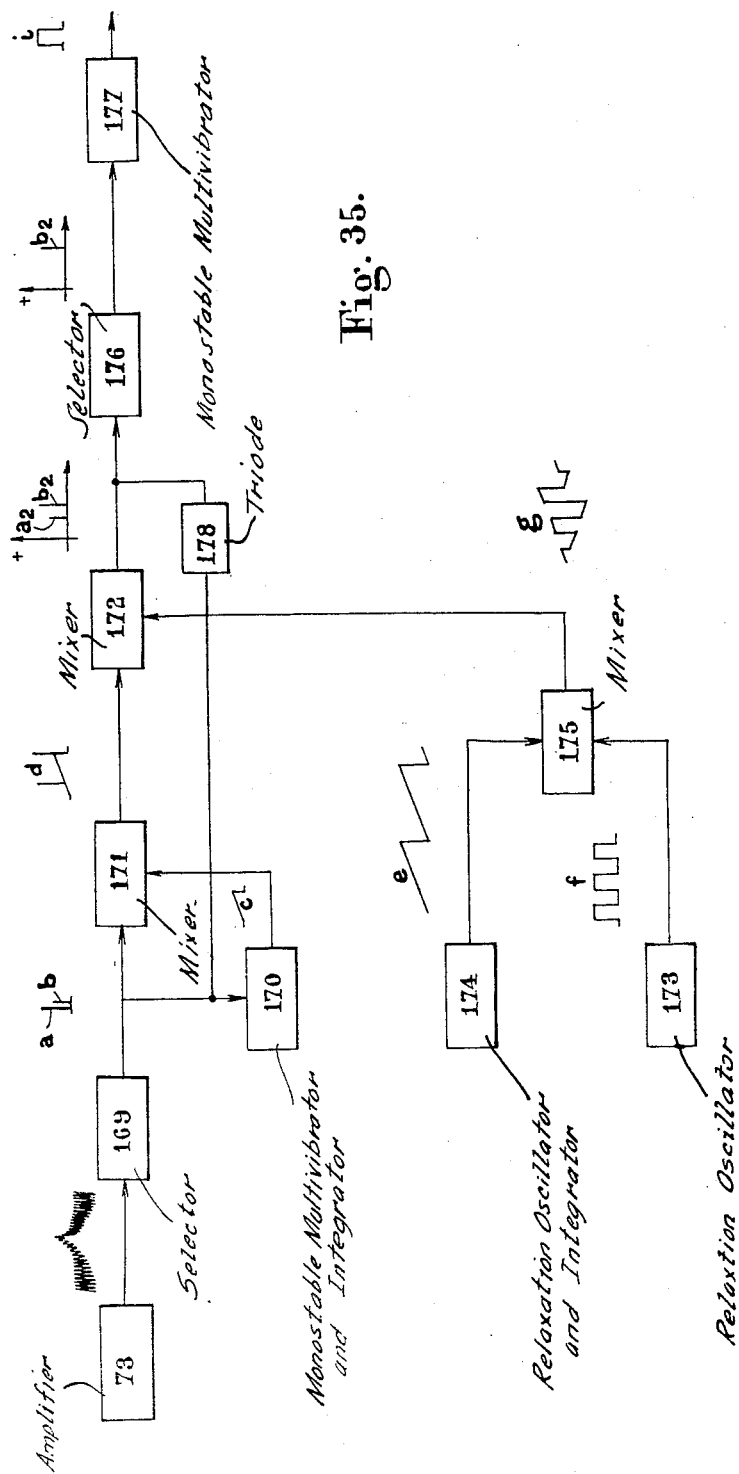
FIGURE 35 is a block diagram showing the principle of a device for continuously indicating average dimensions.
Figure 36:
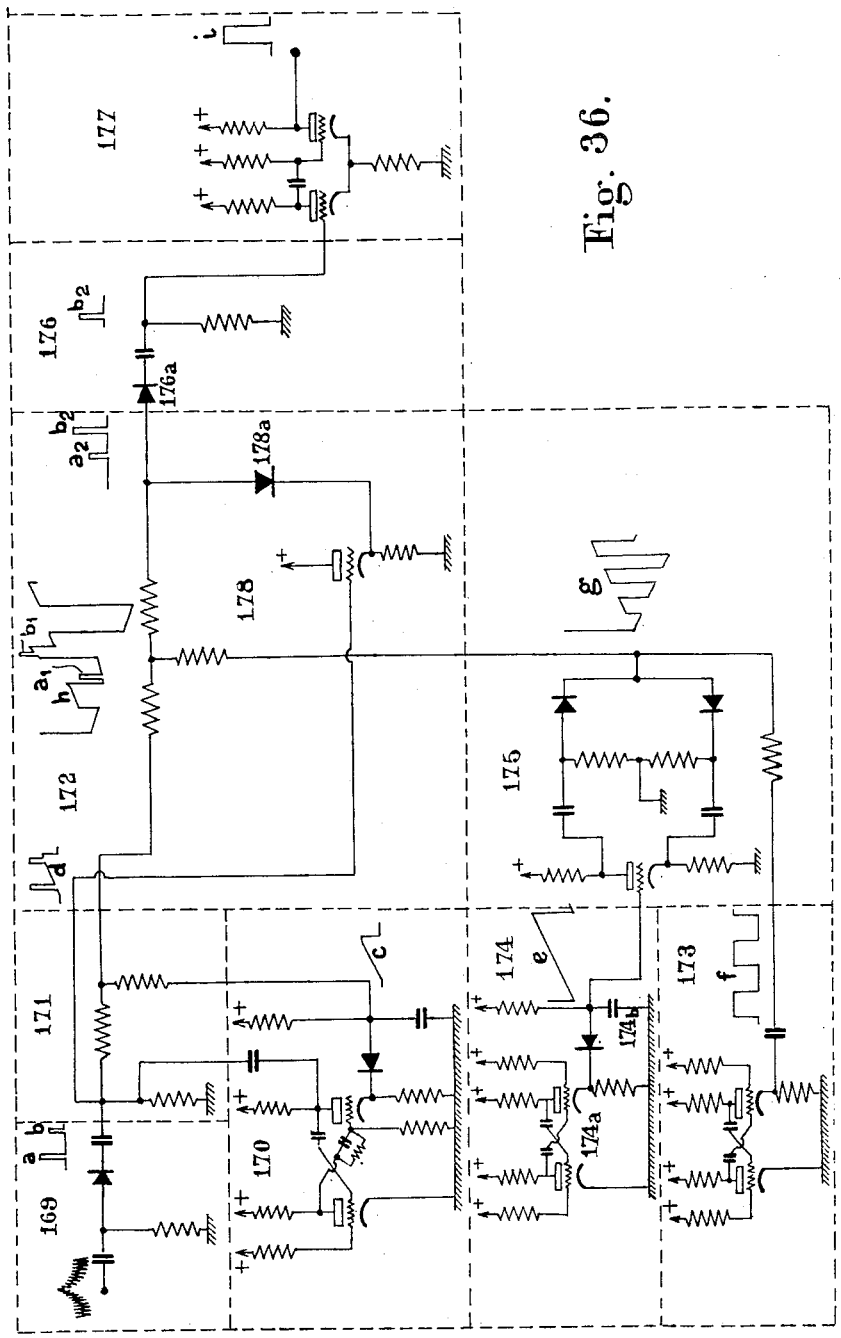
FIGURE 36 is the diagram of the electrical circuit of this device.

The device for providing a continuous and accurate indication of the measured values when they lie between the discontinuous values corresponding to successive or adjacent slots of the disc is illustrated in FIGS. 35 and 36 of the drawings, wherein the portions enclosed in dotted rectangles correspond to those shown in the form of thickline rectangles in the block diagram of FIG. 35.

In these figures the photoelectric signal selector 169 receives the output signals from the amplifier 73 and allows only two adjacent pulses $a$ and $b$ of the photoelectric signal therethrough. These pulses are fed to a monostable multivibrator and integrating circuit 170 synchronized on the first pulse $a$ and producing a linear-variation pulse $c$. The latter is combined in a circuit 171 with the preselected photoelectric signals $a$ and $b$ to yield an output voltage $d$. This output voltage $d$ is then combined in the element 172 with the auxiliary signal $g$ resulting on the one hand from the relaxation oscillator 173 generating a rectangular waveform $f$ and on the other hand from the circuit 174 comprising another relaxation oscillator 174$a$ giving a waveform of greater duration, which is followed by an integrator 174$b$ of which the sawtooth output voltage $e$ is combined with the output voltage $f$ from oscillator 173 in a device 175 adapted therefore to produce a signal $g$ representing the product of these input signals. This signal $g$ is added in the circuit 172 to the signal $d$ transformed in the circuit 171.

Only the pulses $a_1$ and $b_1$ of the output signal $h$ of device 172 are maintained. In fact, the pulses $a$ and $b$ are also fed to the grid of the triode 178 and release this tube. As a result, the cathode potential rises and causes the diode 178$a$ to become blocked. The pulses $a_2$ and $b_2$ in phase with the pulses $a$ and $b$ may then pass through the diode 176$a$. On the other hand, in the absence of such pulses $a$ and $b$ the triode 178 is blocked and the different alternations of the output signal $h$ are derived through the diode 178$a$ and therefore eliminated.

Only the output pulse $b_2$ from 172 which synchronizes the monostable multivibrator 177 producing a signal $i$ of fixed duration is allowed to pass through the last selector 176. This signal $i$ is synchronized only by that output signal from 172 of which the amplitude is greater, that is, the pulse $b_2$.

Under these conditions, the monostable multivibrator of circuit 177 is synchronized by turns with the first or second one of the two preselected pulses at frequencies depending on their relative amplitudes at the output end of 171, thereby providing a continuous indication of the mean values of the dimension of the measured object.

To avoid the influence of fortuitous variations in the photoelectric signal and of an accidental absence of synchronizing pulses in the indication given by the apparatus and relative notably to the measurement of the statistical overstepping, which influence might cause a reduction in the charge of the integrating capacitor of the device which is proportional to the frequency of these "missing" signals, this capacitor is recharged partially in an auxiliary circuit after each occurrence of a missing signal, the quantity of electricity thus provided being proportional to the nominal charge of the capacitor concerned. This action may be obtained by means of a gate transmitting to this capacitor amplified pulses modulated by this charge and of fixed duration, these amplified pulses being produced by an auxiliary monostable multivibrator adapted to actuate this gate and released by a periodic signal upon each revolution of the disc, but normally blocked by the synchronized signal, whereby this recharging action will take place only in case this signal were absent. This effect may be obtained by utilizing the synchronization of this multivibrator by the signal of the disc-driven contact, or from the auxiliary cell, which signal is transmitted through an auxiliary gate actuated by the monostable multivibrator synchronized on the main photoelectric signal, so that this pulse will be transmitted only when this signal is missing.

The disturbing signal caused by the diaphragm may be suppressed or reduced by forming said slotted disc with slots which, instead of having a "pitch" varying in a uniform manner as a function of their place in the order of their succession, are characterized on the contrary by successive variations of opposite direction within cycles consisting of one or two consecutive "pitches," whereby the succession of slots of which the tiers are separated by the number equal to that of the "pitches" contained in one cycle, presents one or more series wherein the width is either increasing or decreasing. For instance, the cycle may comprise two successive pitches, the even pitches constituting an increasing series and the odd ones a decreasing series, whereby the sum of any two successive pitches will not show a variation greater than that corresponding to one or two successive even or odd pitches. The diaphragm employed therewith has a width approximating that of several pitches constituting this cycle, or a whole number of cycles (for example the width of two or four pitches in the example contemplated hereinabove). The signal produced thereby is periodical and has a low amplitude. The signals resulting from the image of the object to be measured, of which the width is close to that of a single pitch or of a number of pitches which is only one fraction of this cycle, constitute a series and therefore the terms of a tiers which is a multiple of the number of pitches per cycle presenting separately the variations corresponding to a single series of pitches regularly increasing or decreasing, and permitting therefore the measurement according to the means set forth hereinabove. A selection of the maximum or minimum signals, or their periodic selection by a "gate" actuated by a frequency divider synchronized on the photoelectric signals will allow therethrough only signals corresponding to this last-mentioned series. It will thus give back a series of signals varying in a uniform manner and to which the synchronizing methods contemplated in the other mountings may be applied. This method of reducing disturbing signals may be used in conjunction with the other methods proposed herein.

The disturbing signal caused by the diaphragm may also be eliminated by causing its width to vary during the rotation of the slotted disc as a function of the variation in the pitch of these slots. This effect may be obtained by forming one or both of the edges of said diaphragm by the limits of the opaque surface of adequate shape of a disc driven or synchronized by the slotted disc. This effect may also be obtained by having one of the diaphragm edges formed by a blade which is driven, through the medium of a suitably shaped cam, from the slotted rotating disc so as to be oscillated thereby.

Figure 37:
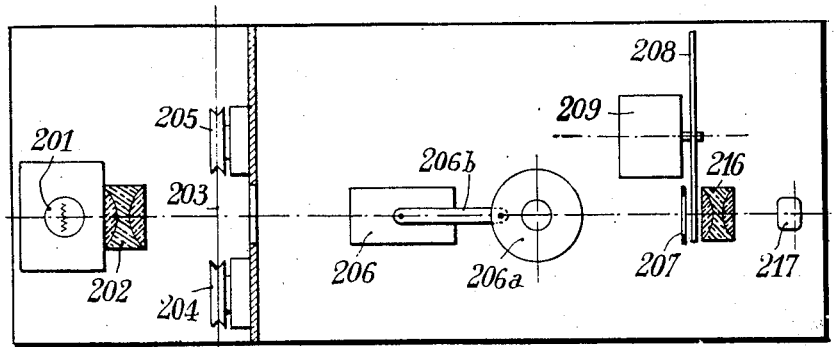
FIGURE 37 is a diagrammatic plan view showing the mechanical and optical components of another form of embodiment of the apparatus.
Figure 38:
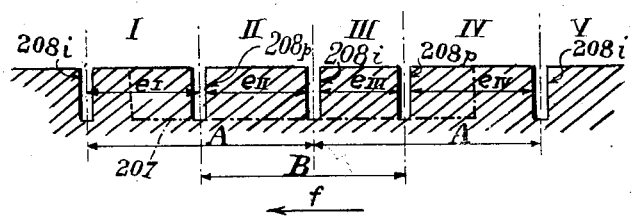
FIGURE 38 is a fragmentary developed view showing the peripheral portion of the slotted disc.
Figure 39:
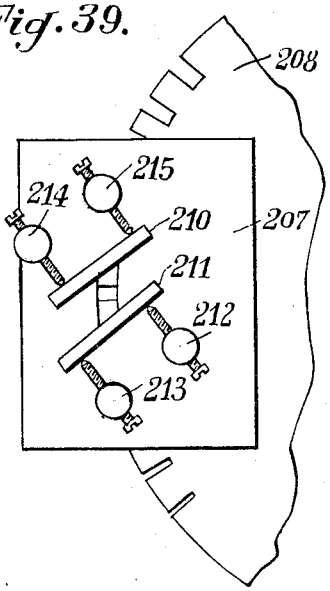
FIGURE 39 illustrates details of the disc and diaphragm assembly utilized in this apparatus.

FIGS. 37 to 39 of the drawings illustrate in diagrammatic form the mechanical and optical components of a modified embodiment of the apparatus. The lamp 201 illuminates through a condenser 202 the wire or cable 203 guided by a pair of aligned rollers 204 and 205. The image of this wire is formed by the lens 206 on the diaphragm 207 disposed in front of a series of slots formed in the peripheral portion of the rotary disc 208 driven from the motor 209. This lens 206 slides along the optical axis and may be placed in two different positions controlled by means of a crank-forming disc 206a and a connecting-rod 206b, these positions providing two different magnification ratios opposite to each other, as well as two different scales of measurement.

The disturbing signal produced by the diaphragm 207 is due to the fact that the width of the successive "pitches" (angular distance between the edges positioned on the same side of consecutive slots) of the slotted discs contemplated is variable. This disturbing signal may be suppressed or at least strongly reduced if the disc is formed with slots (of fixed or variable width) so distributed that the sum of two successive "pitches" be constant, whilst their difference varies gradually, notably according to an arithmetic progression. Under these conditions if the edges of the diaphragm (which may be either convergent towards the disc axis, or inclined, curved, or optically vignetted to ensure an additional attenuation of the disturbing signal) are formed therebetween with two or any other even number of these "pitches," the signal produced by the diaphragm is practically cancelled whereas the signals resulting from the movement of these slots past the narrower image of the measured object will be so arranged successively that the even signals on the one hand and the odd signals on the other hand will show the characteristics of a series of pulses which are firstly decreasing and then increasing and pass through a minimum value for a certain position of the disc which corresponds to the actual dimensions of the measured object. Under these conditions, it is possible to separate these two sequences of signals (that is, the even signals and the odd signals) and utilize each of them separately for effecting measurements of magnitudes lying between different limits, so that the total range of permissible measurements may be widened by using very simple means.

A typical form of embodiment of the disc 208 and diaphragm 207 is shown by way of example in FIGS. 38 and 39 of the drawings. FIG. 38 shows successive, relatively narrow slots of fixed width which are formed in the outer peripheral edge of the disc comprising alternate even and odd slots 208p and 208i respectively. The even slots 208p are disposed at equal spaced intervals from each other (distance A) and the odd slots 208i are also formed at equal spaced intervals (distance B). These distances A and B however differ slightly from each other and in the example illustrated A is slightly greater than B. In this case the distance $e$ between two successive slots, when the disc moves in the direction of the arrow $f$ in the figure, decreases gradually for the pairs of successive slots of the odd series I, III, . . .; in other words, $eI$ is greater than $eIII$, and so forth, but on the other hand this difference increases for the pair of successive slots of the even series II, IV . . ., so that $eII$ is smaller than $eIV$ . . . etc. The sum of the differences between two adjacent pairs of even and odd slots remains constant, so that $eI+eII=eIII+eIV$, etc. . . .

The pairs of slots correspond for a given direction of rotation of the disc to a first scale of measurable diameters of the wire or cable, and for the opposite direction of rotation (the disc comprising an odd number of slots) to larger wire diameters.

The diaphragm 207 is formed with an aperture limited by a pair of oblique plates 210 and 211 the position and inclination of which may be adjusted by means of screws 212, 213 and 214, 215 so that the disturbing signal produced by this diaphragm may be reduced to a minimum.

The flux having passed through this disc is collected by a condenser 216 and strikes the cell 217.

More generally, the slotted disc may consist of a series of "groups" of successive "pitches," each "group" comprising a fixed number of "pitches" such as two, three, four, these pitches having a constant total width, but the width of each "pitch" in a same "row" (1st, 2nd, 3rd . . . row) in these groups vary gradually. The diaphragm of sufficient width has in this case a width equal to that of one or more of these groups of "pitches" and therefore produces a negligible residual signal, whereas the image of the object covers only a single "pitch" or a number of "pitches" inferior to that contained in a group. A series of photoelectric signals corresponding to the "pitches" of same row in each group is selected and thus signals having the characteristics required for the measurement of the dimensions of the object are obtained. The measurements, for each sequence of signals of a given row, lie if desired between different limits, that is these correspond to a particular scale.

The selections of signals from a same "row" in such groups of successive signals (corresponding to the effects of the "pitches" of a same "row") and notably the selection of the even or odd signals in case these groups comprise only two signals, may be accomplished due to the provision of a "gate" through which the photoelectric signal can pass only during a short time interval. This "gate" is actuated by means of a monostable or unstable multivibrator providing a period substantially equal to the duration of a group of signals having a fixed total duration (of a pair of signals in the specific case contemplated), synchronized either directly with the photoelectric signal, or with auxiliary photoelectric signals generated by a photocell illuminated through a narrow slot by an auxiliary series of equally-spaced slots in the disc, the relative spacing of these slots being equal to the sum of the "pitches" of a same group, notably of a pair of consecutive "pitches."

The introduction of an adequate initial time-lag or the simple reversing of the direction of rotation of the disc in the case of a group comprising two successive pitches, permits of selecting such or such other "sequence" of signals of same "row" belonging to successive groups of signals.

With a same arrangement it is possible to accomplish simultaneously the selection of a single "sequence" of such signals corresponding to a given measurement scale or range and the selection of the minimum signal in this "sequence," due to the provision of a monostable multivibrator synchronized by photoelectric pulses the duration of which is slightly inferior to that of the group of signals corresponding to an assembly of "pitches" of fixed total width. This multivibrator is synchronized only by the signals of a same "sequence" of fixed "row," but this synchronization does not occur when the corresponding signal of this "sequence" is zero or minimum, and therefore inferior to the "threshold" of synchronization, which signal corresponds to the dimension to be measured.

The voltage of this multivibrator may be integrated (with consequent resetting of the integrator after each oscillation) and displays in this case a maximum at the time of this "desynchronization," due to the longer duration of its oscillation. An amplitude selector permits at this time the transmission, through a "gate," of an auxiliary voltage generated in the apparatus which is proportional to the number of "pitches" preceding the synchronization time or moment (or the release of this auxiliary voltage of which the final value complementary to the preceding one will in this case be transmitted through a "gate"). This voltage may be obtained notably in a circuit for counting the photoelectric pulses or those of the aforesaid multivibrator. The thus transmitted voltage represents directly the local dimension of the measured object.

In a device of the type referred to hereinabove and when the group of signals having a fixed total duration comprises only two successive signals, it is possible by simply providing an odd number of "pitches" on the disc and reversing the direction of rotation of this disc to use the same device for selecting either even signals or odd signals, and measuring dimensions lying between the limit-values of two different corresponding scales.

In order to avoid the effect produced by the displacement of the measured object within the optical field of the apparatus, the minimum value of the photoelectric signal is determined neither after its time phase (as the latter may be modified by this displacement), nor after the time phase of the slotted disc, but according to the direct or indirect counting of the number of photoelectric pulses preceding or following it from the origin of the "scanning" or until the latter is completed, or from and until the time when a certain predetermined number of these photoelectric pulses are integrated in an electronic counter.

This totalization of the pulses may be accomplished by any type of counter and notably by a decimal counter wherein the photoelectric signals from a same "sequence" of a given "row" will synchronize a monostable multivibrator the signals of which are subjected to an integration thus producing graduated or "stepped" voltages. This integrator is discharged by an auxiliary circuit when a certain level, for example that corresponding to ten successive pulses, is attained, the pulse of this discharge being transmitted at the same time to another integrator representing in this case the number of signal "tens." This integrating operation may be limited in the time by a "gate" actuated by a bistable multivibrator released when the signal is minimum on the one hand and at the beginning or the end of the scanning (when high-amplitude pulses adapted to be selected are effective) on the other hand. The voltages from these totalizers may be transmitted through a "gate" released by a monostable multivibrator of short duration when the photoelectric signal is minimum to circuits having a great time constant which ensure the integration to produce an information notably in connection with the mean dimension. Thus, the latter may be represented on two different instruments, one indicating the "tens" and the other the "units" of the magnitude thus measured.

The above-defined means are also suitable for producing an electrical voltage proportional to the "statistical overstepping" of an adjustable "critical dimension" by the dimension of the measured object. This can be achieved by simply integrating the difference between the voltages transmitted through the aforesaid "gates" and another, adjustable voltage corresponding to the "critical dimension" (for the "units" indications only, if the variations in local dimensions are small enough), or integrating the photoelectric pulses or those from a multivibrator synchronized by these last-mentioned pulses, between the moment where the photoelectric signal is minimum and detected in the preceding circuits and another moment whereat the number of totalized pulses attains a certain adjustable limit which may be determined for example by an amplitude selector or a so-called "Schmitt multivibrator" responsive to the voltage of the "units" and "tens" integrators. The voltages thus integrated between the above-defined limits may subsequently be transmitted through a circuit having a high, adjustable time-constant and readable on a measuring instrument indicating, with respect to an initial presetting or adjustment of a "critical dimension," the "statistical overstepping" in the plus or minus direction. The voltage supplied to this instrument may be opposed to another voltage adjustable by means of a potentiometer with a view to determine, as a function of this voltage value, the rotation of the engine in one or the other direction through the medium of a reducing gear, this voltage controlling the modification of the "standard" of the average diameter of a cable during its manufacture. On the other hand, this "standard" of the average diameter is determined by means of a potentiometer wherein the voltage of the slider contact is opposite to that representing the measured mean value of the cable and permits, through the medium of a relay, of modifying the adjustment of the machine which controls the diameter of the cable during its manufacture.

The knobs of the potentiometer which determine the initial and variable "standard" of the mean diameter, the "critical diameter" and the predetermined value of the "statistical overstepping," may be operatively connected to pointers movable in front of fixed scales or dials, notably the scales of the corresponding measuring instruments (whether only of the "units" or also of the "tens"). When the "statistical overstepping" differs from the value thus readable on this or these scales or dials, a relay causes a motor to rotate in the proper direction so that, through the intermediary of a reducing gear, the position of the knob controlling the value of the mean diameter "standard" may be modified accordingly. This knob, in turn, controls a relay in order to modify the conditions of manufacture of a wire or cable in order to keep to a constant value the thus ascertained mean diameter.

A slow shift or impairment of the photoelectric signals due to alterations in the characteristics of the illuminating lamps, of the intermediate optical medium (dust deposits, etc.), of the amplifying lamps, etc, as well as to the unequal transparency of the different zones of the disc or to the supply of A.C. to the lamp, is avoided by an electrical differentiation of the photoelectric signal or its transmission through a high-pass filter on the one hand and the use of electrical amplifying circuits with automatic gain control, responsive to the voltage of the detected photoelectric signal, on the other hand.

A progressive indication of the average dimensions in the range limited by those dimensions that cancel the photoelectric signals corresponding to the adjacent "pitch" of the disc may be obtained by gradually displacing the threshold of synchronization of the monostable multivibrator which is thus synchronized with different frequencies now on one, now on the other of the two adjacent pulses of the minimum amplitude. To this end there is added to the photoelectric signal a "stepped" voltage obtained by integrating the pulses of a monostable multivibrator which are produced at each revolution of the disc until the level of this integrated signal reaches the amplitude difference of the two adjacent photoelectric pulses. Under these conditions the mean value and the statistical overstepping value are indicated gradually since the synchronization takes place at the time of the incidence of the two adjacent photoelectric pulses with frequencies that are inversely proportional to the discrepancy between the measured dimension and that causing the cancellation of each of these two adjacent pulses.

The same effect may be obtained by transmitting through a "gate," at the "desynchronization" time, the photoelectric pulse itself and by introducing it with a suitable amplitude into the mean-value integrating circuit. As a matter of fact, the amplitude of this pulse depends on the discrepancy between the measured object and that corresponding to its complete cancellation.

In the device utilizing "tens" and "units" counters as contemplated hereinabove the measurement of the statistical overstepping can only take place when the local dimension of the object does not exceed the limits of a "ten." To avoid errors if these limits are overstepped, signals capable of modifying the value of the "tens" in the plus or minus direction may be used for closing or opening a "gate" causing the transmission of signals of which the integration gives the measure of the "statistical overstepping." If desired, the "tens" voltages may be combined with the (ten times smaller) "units" voltages (which are opposite to the analogous pre-adjusted voltages) in order—notably for the operation of relays—to yield a voltage that will not change its sign when the limits of a "ten" are overstepped. An auxiliary relay may also be actuated by a voltage resulting from the opposition of the "tens" voltage with another voltage taken from a potentiometer driving a pointer in front of the scale of the "tens" measuring instrument. When the difference between these two voltages exceeds the value of one "ten" this auxiliary relay maintains the direction of rotation of the motor irrespective of the position taken by the main relay actuated as a function of the "units."

In the above-described apparatus the indications concerning the local dimension may be displayed by means of a small oscillograph wherein the vertical deflection members are responsive to the instantaneous "tens" voltage and the horizontal deflection members to the "units" voltage (or vice versa). The spot illumination may be controlled by the multivibrator releasing the "gate" by which these voltages are transmitted. Thus, on a squared pattern disposed in front of this oscillograph there appear luminous points of which the position read vertically and horizontally represents at any moment the local dimension. If a progressive indication is used the "points" are divided into two and the approximate estimation of the intermediate value may be made as a function of the uneven brightness of the two visible points. With this device it is possible to ascertain the case in which the local dimension is close to the limits of a ten and wherein a scale switching may prove useful by suppressing a variable number of elementary pulses.

Now an electrical circuit according to the foregoing will be described with reference to the block diagrams of FIGS. 40 and 40a and to the wiring diagrams of FIGS. 41 and 42. In these last-named figures the portions surrounded by dotted lines correspond to the rectangles of the block diagrams and are designated by the same reference numerals. The signals produced by the various components illustrated in the block diagrams are indicated above the connections issuing from these components.

In FIG. 40 the current from the photoelectric cell 217 is amplified at 218 and for a given wire diameter produces a sequence of even pulses having substantially the same amplitude as the odd pulses (or vice-versa) characterized by a progressive decrease, a cancellation and a sign reversal beyond a certain number of pulses, depending on the diameter of this wire. The amplified current is derivated in element 219 and further amplified in element 220, this amplification being adjusted by a detection of the signal at 221 and a biasing of a variable-slope lamp producing an output signal of substantially constant average value and presenting a minimum for odd signals. This signal is chopped in the next circuit 222 at a level defined by a series of "steps" of moderate amplitude difference which varies at each revolution of the disc as a function of the device 223 to be referred to presently. The signal is then amplified and chopped in element 224 and synchronizes a monostable multivibrator at 225 which produces a series of pulses of equal duration slightly inferior to that separating two adjacent odd pulses, except in the absence of the photoelectric signal or when this signal is minimum; in this last case this duration is increased due to the absence of any synchronization.

The signal issuing from this multivibrator is subjected to a first integration (and amplitude limitation) in a circuit 226 having a low time constant, then to a derivation attended by a selection of the maximum at 227 so as to produce a first high-amplitude pulse at the beginning of the scanning cycle and another one at the time corresponding to the oscillation of maximum duration issuing from 225.

The signal issuing from 226 is further transmitted through an integrator circuit having a high time constant at 228 and produces at the beginning of the scanning cycle and at the desynchronization moment of 225 maxima of unequal amplitudes. This signal is combined at 229 with the short-duration signals from 227 so as to produce at the output of 229 the appearance of short-duration voltage peaks exceeding a certain level at the beginning of the cycle as well as at the time of desynchronization of 225. These two pulses undergo an amplitude selection at 230 and synchronize a bistable multivibrator 231 of which the pulse begins with the cycle and terminates at the time of the desynchronization of 225 under the influence of the signal from 227. This signal is fed to 232 and its initial part synchronizes a monostable multivibrator generating a signal 232a of a duration adjustable to three values by means of the switch 233. This signal 232a provides a so-called "gate" effect whereby a number of initial pulses taken from 225 and transmitted through the circuit 234, are suppressed, for the purpose of shifting the "units" integration scales (as will be explained hereinafter) when the measurement is to take place near the ends of the "units" scale (in case the measurement lies for example from 0 to 2 or 8 to 10 units). For instance, this switching may correspond to the suppression of 5 or 10 pulse units emitted from 225.

The signal thus transmitted synchronizes a monostable multivibrator 235 generating signals 235a of short duration. The duration of signals 235a is controlled as a function of the mean voltage of the signal of this multivibrator which was detected by the circuit 236, with the consequence that this duration is stabilized.

Moreover, the pulses from the bistable multivibrator 231 produce during their final part the synchronization of a monostable multivibrator 237 generating short-duration signals 237a adapted to control a "gate" for transmitting the values to be measured to the integration circuits to be explained presently.

The pulses 235a are fed from the circuit element 235 to the integrator circuit 238 (FIG. 40a) developing a "stepped" integrated voltage comprising ten successive levels and adapted, when its amplitude attains the maximum value, to start the oscillation of a monostable multivibrator 239 causing the discharge of the integration circuits of 238. (This discharge also takes place under the influence of the pulses 232a corresponding to the beginning of the cycle, which are emitted by the element 232.) The signal resulting from the "units" of which the "counting" may be "taken" at the time of the synchronization of 225 is subjected to the action of the gate 240 responsive to the short-duration signal 237a of element 237, for transmitting the instantaneous value of the "units" integrator to circuit 241 causing a detection of its peak value.

The thus integrated voltage representing the mean value of the "units" is electrically opposed in the next element 242 to a voltage adjustable by means of the potentiometer 243 (in combination with an auxiliary D.C. from 251 intended for compensating the variation in the number of units due to the control of 233). The voltage resulting from this opposition actuates—after its detection in a circuit of which the time constant is adjustable at 242—a reversing relay (not shown) adapted, by means of an electromotor driving for example a capstan, to modify the diameter of a cable during its manufacture. The voltage integrated in element 242 is fed at the same time to a measuring instrument 244 indicating the mean value of the "units."

The pulses delivered by element 239 and controlling the discharge of circuit 238 actuate the integrator 245 similar to 238 and producing a "stepped" voltage representing the "tens" of pulses. This circuit comprises resetting means responsive (like the device 238) to the output signal 232a of element 232 at the beginning of the cycle. The integrated signal is passed through a "gate" 246 similar to gate 240 and responsive like this gate to the pulse 237a from 237. The momentary "tens" voltage thus obtained is transmitted through a high time-constant circuit 247 and actuates the measuring instrument 248 showing the "tens" value to be added to the reading of instrument 244 for defining the mean diameter of the cable.

To measure the "statistical overstepping" (by defect) the "units" voltage from 238 is transmitted through an "amplitude selector" circuit 249 operating from a level adjustable by means of a potentiometer 250, the value of this level also depending on the position of the switch 233a associated with 233 and compensating the effect of the units suppressed from those isuing from 225. The voltage transmitted through 249 synchronizes immediately as it appears a monostable multivibrator 252 producing a signal the phase of which depends on the adjustment of the potentiometer 250. The signal of this monostable multivibrator synchronizes another bistable multivibrator 253, the output signal of which is electrically opposed to that issuing from a multivibration 254 synchronized by the output pulse 237a of 237 corresponding to the desynchronization of 225 and restored to its initial state at the same time as 253 by the pulse from 239 corresponding to the end of the "units." The two voltages from 253 and 254, which are electrically opposed at 255, produce a difference constituting a signal the duration of which depends on the discrepancy between the voltage pre-adjusted by the potentiometer 250 and the voltage indicating the number of "units" in the local diameter. The resulting signal acts upon the "gate" 256 transmitting a number of pulses 235a from 235 which is proportional to this duration. These pulses actuate the integrator 257 discharged at the end of the scanning cycle by the pulse 237a from 237, with the result that the duration of the maximum integrated voltage is increased. This voltage is subsequently transmitted through an (adjustable) circuit 258 having a high time constant and permits of reading on the instrument 259 the value of the "statistical overstepping."

The integrating capacitor of 257 is shown in FIGS. 40a and 42. It may assume two very different values accordingly as the switch 257a is in position "1" or position "2." The integrator 257 comprises in addition a device for limiting the maximum integrated voltage. As a result, when the switch 257a introduces a relatively large capacity into its circuit, the integration takes place normally at each incident pulse, without attaining the level set by the limiter. When on the contrary the low capacity is switched on, the level set by the limiter is attained after the incidence of a single pulse and the incidence of the other pulses will not change the output voltage. Thus, a "weightened statistical overstepping" indication (as a function of the difference between the local diameter and the "critical diameter") in the first case and a "unweightened statistical overstepping" indication in the other case are provided.

This voltage is opposed at 260 to another voltage adjustable by means of the potentiometer 261 and actuates as a function of the resultant voltage the relay 262 controlling through a reversing switch 262a the reversal of the direction of rotation of the motor 263 controlling through the medium of a reducing gear the sliding contact of the potentiometer 243 providing the definition of the mean diameter "standard" of the wire or cable during its manufacture.

The rotation of this motor controls through the medium of a cam 264 and a reversing switch 265 a periodic discharge of the integrating circuit of element 260 (controlling the relay 262 and adapted to be separated from that feeding the instrument 259), with the consequence that the "statistical overstepping" voltage opposed to the voltage output of 261 is restored to zero value after a number of revolutions of the motor 263 which corresponds to its initial value and that the oscillations of the assembly comprising this apparatus and the devices controlling the cable diameter during its manufacture are damped out.

A complementary optional circuit is also illustrated in FIGS. 40 and 41. It is intended for providing an indication of the intermediate values of the diameter between those corresponding to an integer or whole number of "pitches" of the disc, or to the complete cancellation of a pulse of the photoelectric signal. To this end the pulse from 228 actuates a Schmitt multivibrator 266 released at the beginning of each scanning cycle. This multivibrator synchronizes in turn a monostable multivibrator 267 producing short-duration pulses. These pulses are integrated at 223 and produce "stepped" voltages of a level increasing by a same quantity at each scanning revolution. This last-named integrated voltage is subjected to a detection of its maximum, at 268, and restored to its initial value when its value exceeds a predetermined limit. The thus generated voltage has a total amplitude of the order of that separating two successive photoelectric pulses close to the minimum and delivered from the circuit of 222. This auxiliary voltage applied to this last-mentioned circuit causes the threshold of synchronization of 225 to shift between the levels of two photoelectric pulses close to zero with a frequency depending on their amplitude and will therefore produce an integration effect of average value which corresponds to the actual dimension of the measured object.

What I claim is:

1. An apparatus for measuring the transverse dimension of an object such as a wire, cable, tube or tape, which comprises an emitter of radiant flux, a diaphragm limiting said flux, a photoelectric receiver of the radiant flux passing through the field occupied by said object and through said diaphragm, a modulating member located in the flux path from said source to said photoelectric receiver, said modulating member comprising a surface also receiving said radiant flux, said surface comprising a series of contiguous zones which are alternately opaque and transparent to said flux and are bounded by sharp lines of demarcation between successive zones, said series of zones having selected pitch measured between corresponding boundary lines of like zones, an optical system projecting an image of said object on said surface of said modulating member so that said image and said surface lie in conjugate optical planes with the transverse dimension of said image extending crosswise of said zones, means for producing relative periodic movement between said image and said modulating member during a scanning cycle, said movement being in a direction crosswise of said zones, said modulating means and optical system cooperating with one another to vary the relation between the pitch of said zones and the width of said image to cause the width of said image to be approximately equal to the pitch of a zone, said photoelectric receiver sensing the radiation passing through said diaphragm and past said object and modulating member to produce a photoelectric signal corresponding to the radiation received by said receiver, said signal passing through a point of minimum change when the pitch of said zone is approximately equal to the width of said image, an electrical circuit including said photoelectric receiver and means for measuring said photoelectric signal and means to indicate the point at which said approximate equalization of the pitch of said zone and image width occurs and thereby indicate the value of said transverse dimension of said object.

2. An apparatus as set forth in claim 1, in which the pitch is constant throughout said series of zones.

3. Apparatus as set forth in claim 2, in which said diaphragm has an opening equal to a multiple of the pitch of the modulating member in order to cancel the alternating component of the photoelectric current.

4. Apparatus as set forth in claim 1, wherein the width of the image of said object is fixed, and said equalization of said pitch and image width is effected by modifying the pitch of said modulating member.

5. Apparatus as set forth in claim 1, in which said zones are arranged as zones with a sequence of pitches having a gradually varying value, said sequence of pitches of gradually varying value producing in said photoelectric receiver during the scanning cycle a sequence of successive photoelectric signals of which the amplitude has a minimum value when one pitch of said modulating member is approximatively the same as the image of the width of said measured object, and in which said indicating means are provided for selecting the minimum elementary signal in the sequence of said signals.

6. Apparatus as set forth in claim 5, comprising a measuring instrument of the integrator type and means for applying to said integrating measuring instrument a current transmitted between the time when the value of said photoelectric signal is minimum and another predetermined fixed-phase time of the scanning cycle, in order to indicate the dimension of the measured object as a function of the phase of the minimum photoelectric signal in the scanning cycle relative to said predetermined fixed-phase time.

7. Apparatus as set forth in claim 5, comprising a multivibrator normally locked and released during a period between the time when the value of said photoelectric signal is minimum to another time of fixed phase in the scanning cycle, said multivibrator having an output current of fixed value, and means for integrating the output current from said multivibrator during said period and thus give an indication of the dimension of the measured object.

8. Apparatus as set forth in claim 5, comprising totalizing means for summing up said photoelectric signals between a signal of predetermined phase of the scanning cycle and the time when the photoelectric signal is minimum, said indicating means comprising means connected to said totalizing means for giving the measure of the transverse dimension of the object according to the result of the totalization step.

9. Apparatus as set forth in claim 5, comprising means for periodically effecting the control of the electrical circuit as a function of the minimum photoelectric signal in order to effect this control action a plurality of times during successive scanning cycles at the incidence times of the two photoelectric signals nearest to the minimum, with mean frequencies which, for each one of these signals, are inversely proportional to their amplitude and therefore also to the discrepancy between the measured dimension and that at which each one of said two signals would be cancelled, and means for integrating the periodic resultant output signal which, under these conditions, represents a measure of the transverse dimension of said object which is characterized by a precision greater than the dimensional difference capable of cancelling two successive photoelectric signals.

10. Apparatus as set forth in claim 5, wherein the diaphragm consists of at least two partial diaphragms superposed along the direction of the alternate opaque and transparent zones of the modulating member, said partial diaphragms being shifted along the direction of the relative movement of the zones of said modulating member whereby, by virtue of the opposition of the partial signals corresponding to said partial diaphragms, the disturbing signal resulting from the relative movement of said zones of said modulating member relative to said diaphragms is reduced.

11. Apparatus as set forth in claim 5, wherein the diaphragm consists of at least two partial diaphragms superposed along the direction of the alternate opaque and transparent zones of the modulating member, said partial diaphragms having different widths along the direction of the relative movement of the zones of said modulating member whereby, by virtue of the opposition of the partial signals corresponding to said partial diaphragms, the disturbing signal resulting from the relative movement of said zones of said modulating member relative to said diaphragms is reduced.

12. Apparatus as set forth in claim 1, in which said zones of said modulating member are arranged to form successive groups each comprising zones of different pitch, with a minimum of two pitches per group, the sum of said pitches being constant in each group, the value of the pitches in the same relative position in successive groups varying gradually, each sequence of pitches of same position producing in said photoelectric receiver, during a scanning cycle, a sequence of successive photoelectric signals which vary in value according to the relation of the pitch to the width of the image of said object, a minimum signal being produced when the pitch is approximately the same as the width of said image, means for selecting the sequences of successive photoelectric signals which correspond to the pitches of same position, and finally means for determining, from the phase of the minimum photoelectrical signal corresponding to one pitch of said position, the dimension of said measured object.

13. Apparatus as set forth in claim 12, wherein the variations in pitches of the different relative positions which are contiguous and are simultaneously in the radiant flux passed by the diaphragm are such that the sum of said pitches remains approximately constant, whereby the pitches of said position produce only a moderate disturbing signal, this signal being caused by the diaphragm itself and appearing even in the absence of the measured object.

14. Apparatus as set forth in claim 12, wherein each group of pitches comprises two pitches which vary respectively in successive groups according to arithmetic progressions of opposite sense whereby the sum of two contiguous pitches pertaining to each one of two positions which are simultaneously in the radiant flux passed by the diaphragm, is constant and produces only a moderate disturbing signal.

15. Apparatus according to claim 12, comprising means for selecting separately several sets of successive photoelectric signals of same position and applying them to said indicating means to measure the dimensions of the object which lie between different extreme limits.

16. Apparatus as set forth in claim 12, comprising a monostable multivibrator having a cycle slightly less than the time interval elapsing between two successive photoelectric signals in the same sequence, means for producing a fixed-phase initial synchronization of said monostable multivibrator, means for subsequently producing synchronization with the photoelectric signals, means for integrating the output signal from said multivibrator and thereby detecting the absence of synchronization in said multivibrator when, in the selected sequence, the minimum signal does not ensure the synchronization, and finally means for detecting the maximum amplitude of the integrated signal of said multivibrator in order to produce the simultaneous selection of a single sequence of signals and of the minimum signal from said sequence.

17. Apparatus according to claim 16, comprising means for reversing the direction of the periodic relative movement between the image of said object and said modulating member, the total number of pitches of said modulating member being an odd number, and means for causing the synchronization of the monostable multivibrator from the first photoelectric signal of each scanning cycle in order separately to select two sets of signals according to the direction of movement.

18. An apparatus as set forth in claim 12, comprising means for producing an auxiliary voltage proportional to the number of photoelectric signals pertaining to a given relative position which occur within the time period elapsing between a fixed-phase of the scanning cycle and the corresponding phase of the minimum photoelectric signal, and means for obtaining from said auxiliary voltage an indication of the value of the measured dimension.

19. Apparatus according to claim 12, comprising means for counting the photoelectric signals occurring in the time interval elapsing from the occurrence of the minimum photoelectric signal in the selected sequence to at least one fixed phase of the scanning cycle, and means for giving from the result of the counting step the value of the measured dimension while avoiding the detrimental effect resulting from the displacement of the measured object in the optical field of the apparatus.

20. Apparatus according to claim 19, comprising a monostable multivibrator synchronized on the photoelectric signals of a selected sequence of these signals, first integrating means for integrating the pulses produced by said monostable multivibrator, resetting means to which the integrated voltages increasing stepwise from the monostable multivibrator are fed, said last-named means being actuated when a fixed level is attained, means for generating a pulse during the resetting step, second integrating means to which said last-named pulse is fed, a first gate and a second gate connected respectively to the outputs of said first and second integrating means, other means for opening said gates at the end of the time interval elapsing between the minimum photoelectric signal and the fixed phase, first and second indicating means fed respectively from said first and second gates for giving a direct indication and reading of the number of pulses totalized in the apparatus to represent separately the numbers of the different numerical orders defining the local and mean dimensions of the measured object.

References Cited by the Examiner

UNITED STATES PATENTS

| | | | |
|---|---|---|---|
| 2,287,322 | 6/42 | Nelson | 250—233 |
| 2,670,650 | 3/54 | Wilmotte | 88—14 |

FOREIGN PATENTS

| | | |
|---|---|---|
| 325,140 | 12/57 | Switzerland. |
| 760,755 | 11/56 | Great Britain. |
| 791,813 | 3/58 | Great Britain. |

JEWELL H. PEDERSEN, *Primary Examiner.*

WILLIAM MISIEK, *Examiner.*